United States Patent
Takagi et al.

(10) Patent No.: US 7,456,862 B2
(45) Date of Patent: Nov. 25, 2008

(54) CONTROL APPARATUS, CONTROL SYSTEM, CONTROL METHOD AND STORAGE MEDIUM OF THE SAME

(75) Inventors: Tsuneyoshi Takagi, Kawasaki (JP); Yuichi Bannai, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 11/070,029

(22) Filed: Mar. 1, 2005

(65) Prior Publication Data
US 2005/0200716 A1   Sep. 15, 2005

Related U.S. Application Data

(62) Division of application No. 09/351,591, filed on Jul. 12, 1999, now Pat. No. 6,903,765.

(30) Foreign Application Priority Data
Jul. 24, 1998   (JP) ................................ 10 209154

(51) Int. Cl.
*H04N 7/18* (2006.01)
(52) U.S. Cl. ..................................... 348/211
(58) Field of Classification Search ................. 348/211, 348/207.1, 207.11, 211.99, 211.1, 211.2, 348/211.3–211.9, 211.11–14
See application file for complete search history.

(56) References Cited

U.S. PATENT DOCUMENTS

| | | | | |
|---|---|---|---|---|
| 4,132,471 A | * | 1/1979 | Svatek et al. | 396/39 |
| 4,630,110 A | * | 12/1986 | Cotton et al. | 348/153 |
| 5,153,722 A | * | 10/1992 | Goedeke et al. | 348/159 |
| 5,450,594 A | * | 9/1995 | Aden et al. | 709/225 |
| 5,602,933 A | * | 2/1997 | Blackwell et al. | 382/116 |
| 5,608,726 A | * | 3/1997 | Virgile | 370/401 |
| 5,745,167 A | * | 4/1998 | Kageyu et al. | 348/153 |
| 5,854,790 A | * | 12/1998 | Scott et al. | 370/401 |
| 5,936,666 A | * | 8/1999 | Davis | 348/143 |
| 6,133,941 A | * | 10/2000 | Ono | 348/14.05 |
| 6,208,379 B1 | * | 3/2001 | Oya et al. | 248/211.11 |
| 6,271,752 B1 | * | 8/2001 | Vaios | 340/541 |

* cited by examiner

*Primary Examiner*—Nhon T Diep
(74) *Attorney, Agent, or Firm*—Cowan, Liebowtiz & Latman, P.C.

(57) ABSTRACT

Herein provided is a control system capable of efficiently and assuredly performing a remote-control of a plurality of instruments. When the plurality of instruments, which are connected to a network 600 and controllable by a computer, namely a first camera 300 and a second camera 400 as shown in FIG. 1, are remotely and simultaneously controlled, the present system is constituted so that a control right of the second camera 400 acquired by a certain client enables the client to control even the first camera while disenables other clients except for the client which acquires the control right to control both the first camera 300 and second camera 400. Accordingly, it turns unnecessary to individually acquire all of the control rights to control the related instruments, first camera 300 and the second camera 400.

4 Claims, 16 Drawing Sheets

US 7,456,862 B2

CONTROL APPARATUS, CONTROL SYSTEM, CONTROL METHOD AND STORAGE MEDIUM OF THE SAME

CROSS-REFERENCE TO RELATED APPLICATIONS

This application is a divisional of application Ser. No. 09/351,591, filed Jul. 12, 1999 now U.S. Pat. No. 6,903,765.

BACKGROUND OF THE INVENTION

1. Field of the Invention

The present invention relates to a control apparatus, a control system, a control method for controlling a plurality of instruments, for instance, cameras connected to a network from a plurality of remote locations and to a storage medium for storing processing steps of the same thereby to perform control operations so that a computer can read the steps out of the medium.

2. Brief Description of the Related Art

There has been a system wherein a camera and a computer (a terminal station or a terminal console) are connected to each other through a remote spooling (referred to as "RS") serial cable etc., thereby enabling to control camera such as panning, tilting, zooming etc. from the computer as well as to obtain and to set optical parameters such as a distance of an object to be sensed, exposure information etc.

In the system mentioned above, a software (namely, a processing program) for performing said camera control is preliminarily built-in in the computer. Performing the processing program by, for instance, a central processor unit (referred to as "CPU") etc. turns the remote control of the camera from the computer capable.

In that status, if control commands for controlling the camera are input by means of user's manipulating such as a keyboard, a mouse etc. which are connected to the computer, the control commands are transferred to the camera. The camera drives being subjected to the control commands.

Beside this, there has been another system wherein a plurality of cameras and a plurality of computers are connected to a network, respectively, thereby enabling to control the plurality of cameras remotely from the plurality of computers similarly to the system as mentioned above.

Herein in the latter system, if the control commands are output from the plurality of computers simultaneously, for instance, to a certain camera, the control commands contradict to each other, which results in chaos of the camera operations. Accordingly, a concept "a control right" is introduced to prevent the chaos.

In the system wherein the plurality of computers can control the plurality of cameras as mentioned above, however, "the control rights" are allocated equally to the individual cameras. Consequently, if a certain computer simultaneously controls the plurality of cameras which are correlated with each other, the computer has to attain all of the control rights of the cameras that can be control targets.

Accordingly, the user should have performed up to now multiple manipulations on the computer to attain all of the control rights to control the cameras that can be the control targets of the computer, which is a very complicated operation for the user. Further on that occasion, as the user has to provide the computer with the control instructions for controlling the individual cameras after understanding all of the operations of the cameras that can be the control targets of the computer, there arises a problem that the user cannot concentrate his control operations on a certain camera.

SUMMARY OF THE INVENTION

The present invention is carried out to eliminate above-mentioned defects. An object of the invention is to provide a control apparatus, a control system, a control method of enabling to perform efficiently and assuredly a remote control of a plurality of instruments, and a storage medium for storing processing steps of performing the control operations so that a computer can read out.

(1) To satisfy purposes mentioned above, a first technology of the present invention constitutes a control apparatus capable of controlling a plurality of instruments which have specified functions and move relatedly with mutual movements, comprising:

a command input means for inputting a command for controlling said plurality of instruments;

a control right acquisition means for acquiring a control right to control an arbitrary instrument which is selected out of said plurality of instruments;

a storage means for storing information about the control right acquired by said control right acquisition means; and a control restriction means for restricting to an input of the command input by said command input means for controlling another instrument, of which control right is not acquired, in accordance with control right information stored by the storage means.

(2) A second technology of the present invention constitutes the control apparatus described in (1), wherein:

control right information includes at least information indicating three statuses, one of which corresponds to a status wherein no apparatus acquires the control right, another of which corresponds to another status wherein another apparatus acquires the control right and still another of which corresponds to still another status wherein a self apparatus acquires the control right; and said control restricting means for restricting to an input of the control command input by said command input means, on the basis of said control right information.

(3) A third technology of the present invention constitutes the control apparatus described in (2), wherein:

said control restricting means invalidates the command input applied from aforesaid command input means when another apparatus acquires the control right.

(4) A fourth technology of the present invention constitutes the control apparatus described in (1), wherein:

said plurality of instruments which have the specified functions include a camera.

(5) A fifth technology of the present invention constitutes the control apparatus described in (1), further comprising:

a display means for displaying at least control right information stored in the storage means.

(6) A sixth technology of the present invention constitutes a control system capable of controlling a plurality of instruments, which are connected to a network, have specified functions and move relatedly with mutual movement, from a plurality of remote locations, comprising:

a command input means for inputting a command for controlling said plurality of instruments;

a control right acquisition means for acquiring a control right to control an arbitrary instrument optionally selected out of said plurality of instruments;

a storage means for storing information about the control right acquired by said control right acquisition means; and a control restriction means for restricting to control another instrument except for the instrument, of which control right is acquired by aforesaid control right acquisition means, in accordance with said control right information stored by said information storage means.

(7) A seventh technology of the present invention constitutes the control system described in (6), wherein:
the plurality of instruments having specified functions include a camera, further comprising:
an image pickup means for picking up an image signal produced from aforesaid camera; and
a display mean for displaying one of control right information stored in said information storage means and the image signal picked up by the image pickup means.

(8) An eighth technology of the present invention constitutes a method of controlling a plurality of instruments which have specified functions and move relatedly with mutual movements, comprising:
a command input step of inputting a command in use for controlling said plurality of instruments;
a control right acquisition step of acquiring a control right of an arbitrary instrument optionally selected out of the plurality of instruments;
a storage step of storing information about the control right acquired at the control right acquisition step as a flag; and
a control restriction step of restricting to an input of the command for remotely controlling another instrument, of which control right is not acquired, in accordance with control right information indicated as the flag.

(9) A ninth technology of the present invention constitutes the control method described in (8), wherein:
the storage step includes a step of storing information which indicates at least three statuses on the flag, one of which is a status wherein no apparatus acquires the control right, another of which is another status wherein anyone of other apparatuses acquires the control right and still another of which is still another status wherein the self apparatus acquires the control right; and
said control restriction step includes a step of restricting to an input of the control command, in accordance with said control right information stored as said flag.

(10) A tenth technology of the present invention constitutes the control method described in (9), wherein:
said control restriction step includes a step of invalidating said control command input by said command input step when another apparatus acquires the control right.

(11) An eleventh technology of the present invention constitutes the control method described in (10), wherein:
said plurality of instruments which have specified functions include a camera.

(12) A twelfth technology of the present invention constitutes a control method of controlling a plurality of instruments, which are connected to a network and have specified functions and move relatedly with mutual movements, from a plurality of remote locations, comprising:
a command input step of inputting a command for controlling said plurality of instruments;
a control right acquisition step of acquiring a control right to control an arbitrary instrument optionally selected out of aforesaid plurality of instruments;
a storage step of storing information about the control right acquired at aforesaid control right acquisition step; and
a control restriction step of restricting to control another instrument except for the instrument, of which control right is not acquired, in accordance with said control right information.

(13) A thirteenth technology of the present invention constitutes the control method described in (12), wherein:
aforesaid plurality of instruments having specified functions include a camera, further comprising:
an image pickup step of picking up an image signal produced from aforesaid camera; and
a display step of displaying at least one of control right information which is stored at said information storage step and the image signal picked up.

(14) A fourteenth technology of the present invention constitutes a camera control system which is formed of a server/client configuration and is enabling through a network to control a camera, comprising:
a first camera for being controlled in an image pickup direction;
a second camera for being controlled in an image pickup direction;
a control means for controlling the image pickup direction of said second camera which picks up an area within an image pickup range of the first camera; and
a control restriction means for restricting to control the first camera when an arbitrary client acquires a right to control aforesaid second camera using aforesaid control means.

(15) A fifteenth technology of the present invention constitutes the control system described in (14), wherein:
said control restriction means restricts to control said first camera performed by another client does not acquire said control right.

(16) An sixteenth technology of the present invention constitutes a method of controlling a control system which is formed of a server/client configuration and enabling through a network to control both an image pickup direction of a first camera and a second camera, comprising:
a control step of controlling the image pickup direction of said second camera which picks up an area within an image pickup range of said camera; and
a control restriction step of restricting to control aforesaid first camera when an arbitrary client acquires a right to control the second camera.

(17) A seventeenth technology of the present invention constitutes the method described in (16), wherein:
said control restriction step includes a step of restricting controlling said first camera carried out by the other clients except for the client which acquires aforesaid control right of said second camera.

DETAILED DESCRIPTION OF THE PREFERRED EMBODIMENTS

Hereinafter detailed are the preferred embodiments according to the present invention with reference to the drawings from FIG. 1 to FIG. 16. The best modes contemplated by the inventors during carrying out the invention into practice will also be described corresponding to the preferred embodiments.

Figure 1:
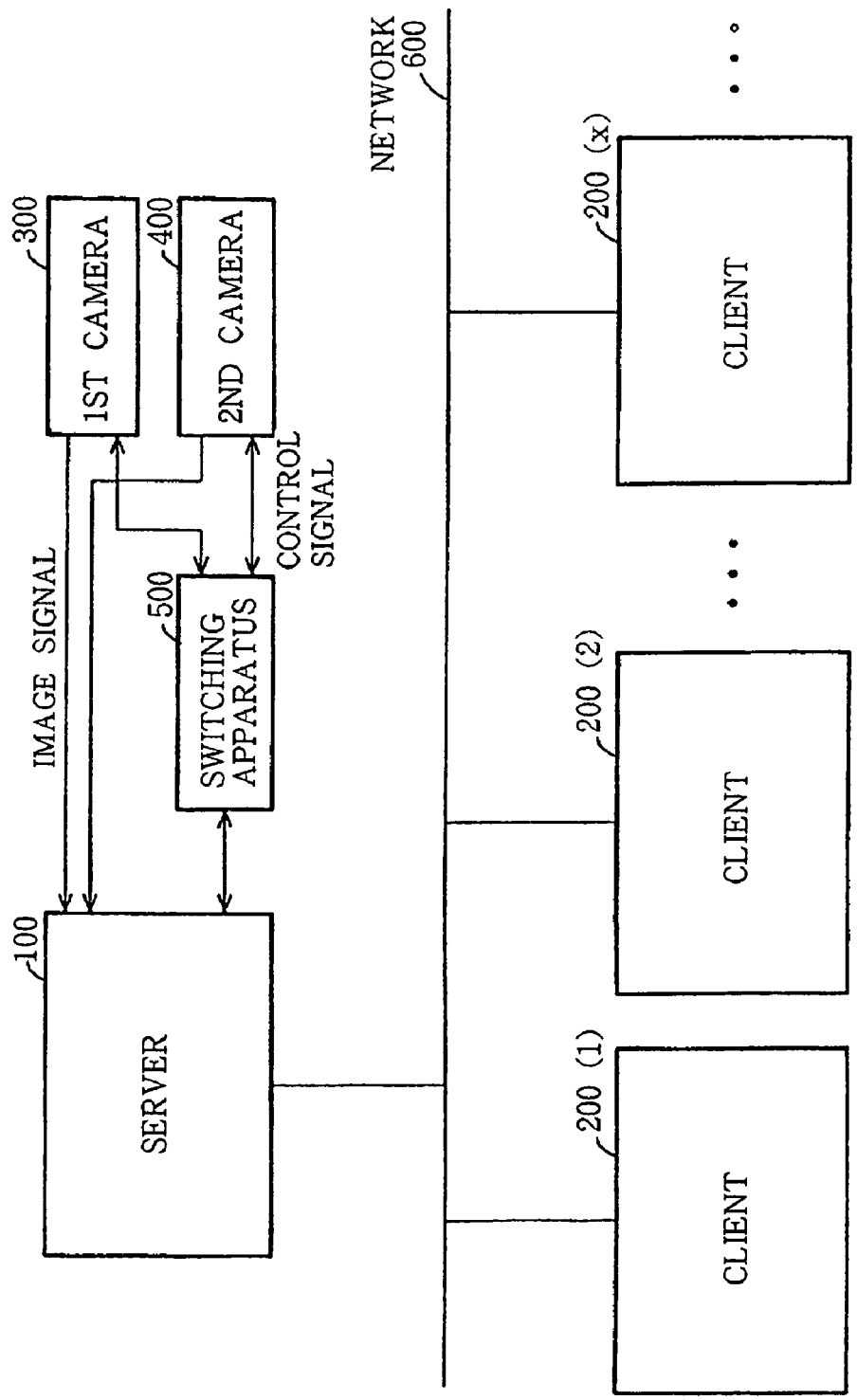
FIG. 1 is a schematic block diagram showing a system according to the present invention.

The present invention is applied to such a system, for instance, as shown in FIG. 1.

First, each partial constitution of the present system is to be described.

As can be seen from FIG. 1 mentioned above, the present system is a sort of server/client systems wherein a plurality of cameras (corresponding herein to a first camera 300 and a second camera 400) are connected through a server 100 of the system (referred simply to as "server" hereinafter) to a network 600 and a plurality of clients 200 (1), 200 (2), . . . , 200 (x), . . . of the present system (referred simply to as "client" hereinafter) are also connected to the network 600.

Further, the server 100 is dually connected, namely directly as well as indirectly through a switching apparatus 500, to the first camera 300 and to the second camera 400.

A control signal (namely, a camera control command) produced from the server 100 to be output is switched by the switching apparatus 500 between the first camera 300 and the second camera 400.

Despite that the description is to be detailed later, the control command (namely, the camera control command) applied, for instance, to Client 200 (x) is transmitted through the network 600 to the server 100. The server 100 which receives said camera control command switches the camera to be applied with said control command by means of providing the switching apparatus 500 with the control signal (namely, the switching control signal).

Image signals respectively picked up by the first camera 300 and the second camera 400 are directly output to the server 100. The server 100 transmits the image signals produced from the first camera 300 and the second camera 400 through the network 600 to each of Clients 200 (1), 200 (2), . . . , 200 (x), . . . , by broadcast communication.

Figure 2:
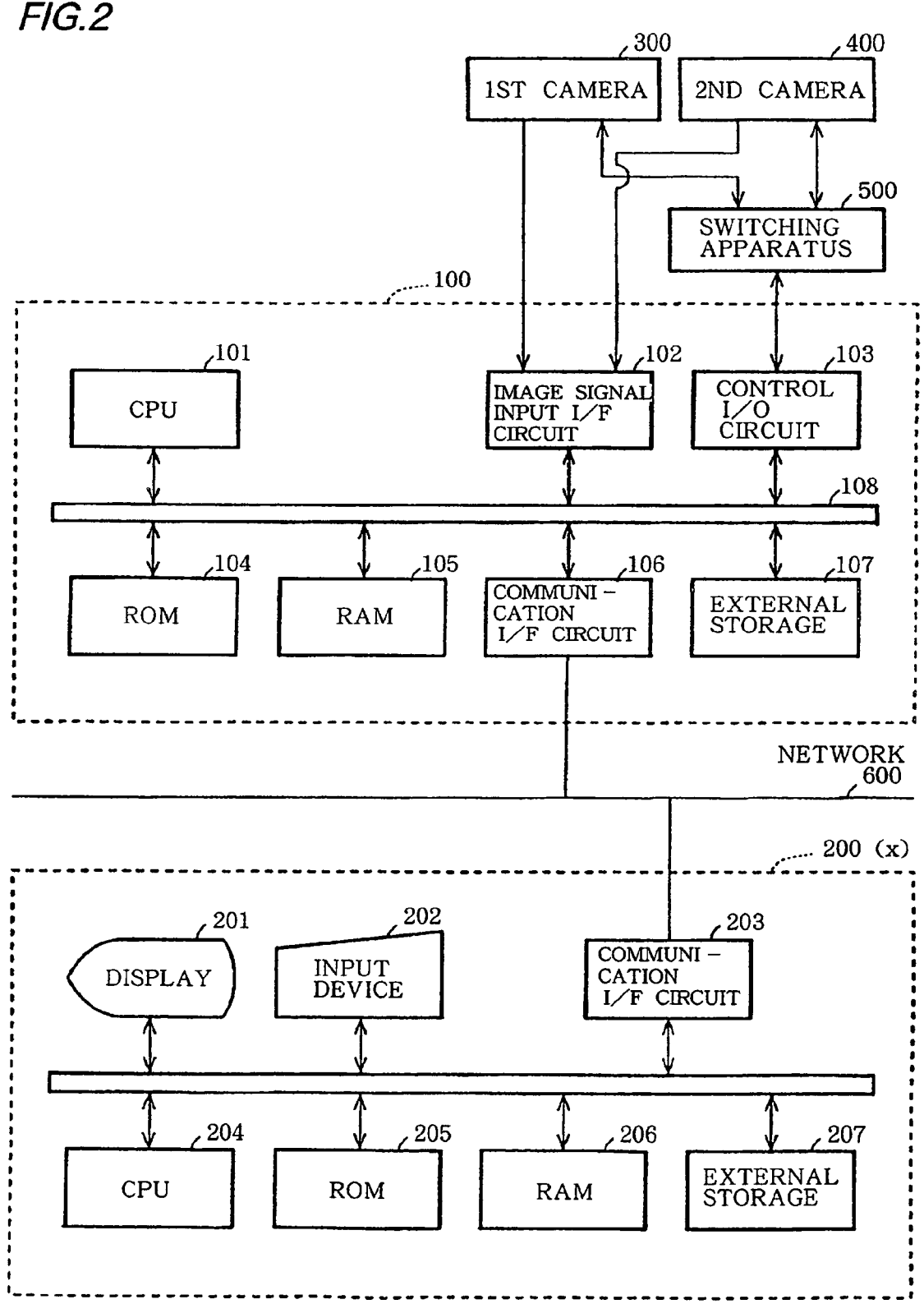
FIG. 2 is a block diagram showing each internal constitution of a server and a client of aforesaid system.

FIG. 2 shows each internal constitution of the server 100 and Clients 200 (1), 200 (2), . . . , 200 (x), . . . .

As shown in FIG. 2 mentioned above, the server 100 comprises a CPU 101, an image signal input interface (referred to as "I/F") circuit 102 which is connected to the first camera 300 and to the second camera 400, a control signal input and output (referred to as "I/O") circuit 103 which is connected through the switching apparatus 500 to the first camera 300 and the second camera 400, a read only memory (referred to as "ROM") 104, a random access memory (referred to as "RAM") 105 and a communication interface (referred to as "I/F") circuit 106, all of which are interconnected through a bus 108 to each other. An external storage 107 is also connected to the bus 108. The communication I/F circuit 106 is connected to the network 600.

The CPU 101 is in use for totally controlling various operations totally allocated to the server 100 by means of reading out processing programs, which are preliminarily stored in the ROM 104, to write in the RAM 105 and by means of executing the read out processing programs.

The first camera 300 and the second camera 400 are connected, respectively, through each video cable having a characteristic impedance etc. to the image signal I/O circuit 102 which receives the image signals picked up during by the first camera 300 and the second camera 400, respectively.

Herein the image signal I/O circuit 102 is constituted so as to be capable of receiving two input signals.

The control signal I/O circuit 103 is connected through the switching apparatus 500 to the first camera 300 and to the second camera 400 by the RS serial cables etc. The control signal I/O circuit 103 performs a data communication about control information between the first camera 300 and the second camera 400.

In the ROM 104, various sorts of the processing programs, whereby the CPU 101 is to execute the processings either by itself or dependently upon the camera control instructions output from Clients 200 (1), 200 (2), . . . , 200 (x), . . . , are preliminarily stored.

The RAM 105 provides the server 100 with a work area, wherein aforesaid processing programs are to be executed, as well as provides with a temporary buffer area, wherein the camera commands and various sorts of data delivered from Clients 200 (1), 200 (2), . . . , 200 (x), . . . , are to be stored temporarily.

The communication I/F circuit 106 is connected to the network 600 for the data communication of the image signals, the camera control commands etc. with Clients 200 (1), 200 (2), . . . , 200 (x), . . . .

The external storage 107 includes a floppy disc drive (referred to as "FDD"), a hard disc drive (referred to as "HDD"), a Compact disc (referred to as "CD")-ROM etc. Preliminarily storing said various sorts of processing programs even in the external storage 107 also enables the CPU 101 to therefrom read out the stored programs and to execute them.

On the other hand, Clients 200 (1), 200 (2), . . . , 200 (x), . . . are respectively constituted similarly to each other. In FIG. 2 mentioned above, the internal constitutions are illustrated about a certain Client 200 (x) as an example.

Client 200 (x) comprises a display device 201, an input device 202, a communication I/F circuit 203, a CPU 204, a ROM 205 and a RAM 206, which are interconnected through a bus 208 to each other. An external storage 207 is further connected to the bus 208. The communication I/F circuit 203 is connected to the network 600.

The display device 201 composed of a cathode ray tube (referred to as "CRT"), a liquid crystal device (referred to as "LCD") etc. and serves to display output signals produced by a window (viewport) system, which is installed and driving on Client 200 (x), and to display the image signals delivered from the server 100.

The input device 202 composed of a keyboard, a pointing device such as a mouse etc. and is operated by a user of Client 200 (x). The camera control instruction mentioned above etc. to Client (x) is applied by this operation.

The communication I/F circuit 203 is connected to the network 600 for the data communication of the image signals, the camera control instruction etc. with the server 100.

The CPU 204 is in use for totally controlling the various operations totally allocated to Client 200 (x) by means of reading out the processing programs, which are preliminarily stored in the ROM 205, to write in the RAM 206 and by means of executing the read out processing programs.

In the ROM 205, various sorts of the processing programs, whereby the CPU 204 executes the processing steps either by itself or dependently upon the camera control instructions applied from the input device 202, are preliminarily stored.

The RAM 206 provides Client 200 (x) with another work area, wherein said processing programs are to be executed, and with another temporary buffer zone, wherein the camera command input through the input device 202 and various sorts of data are to be temporarily stored.

The external storage 207 includes a FDD, a HDD, a CD-ROM etc. It is also possible to preliminarily store said various sorts of processing programs even in the external storage 207 and therefrom to read out the stored programs to be executed by the CPU 204.

Figure 3:
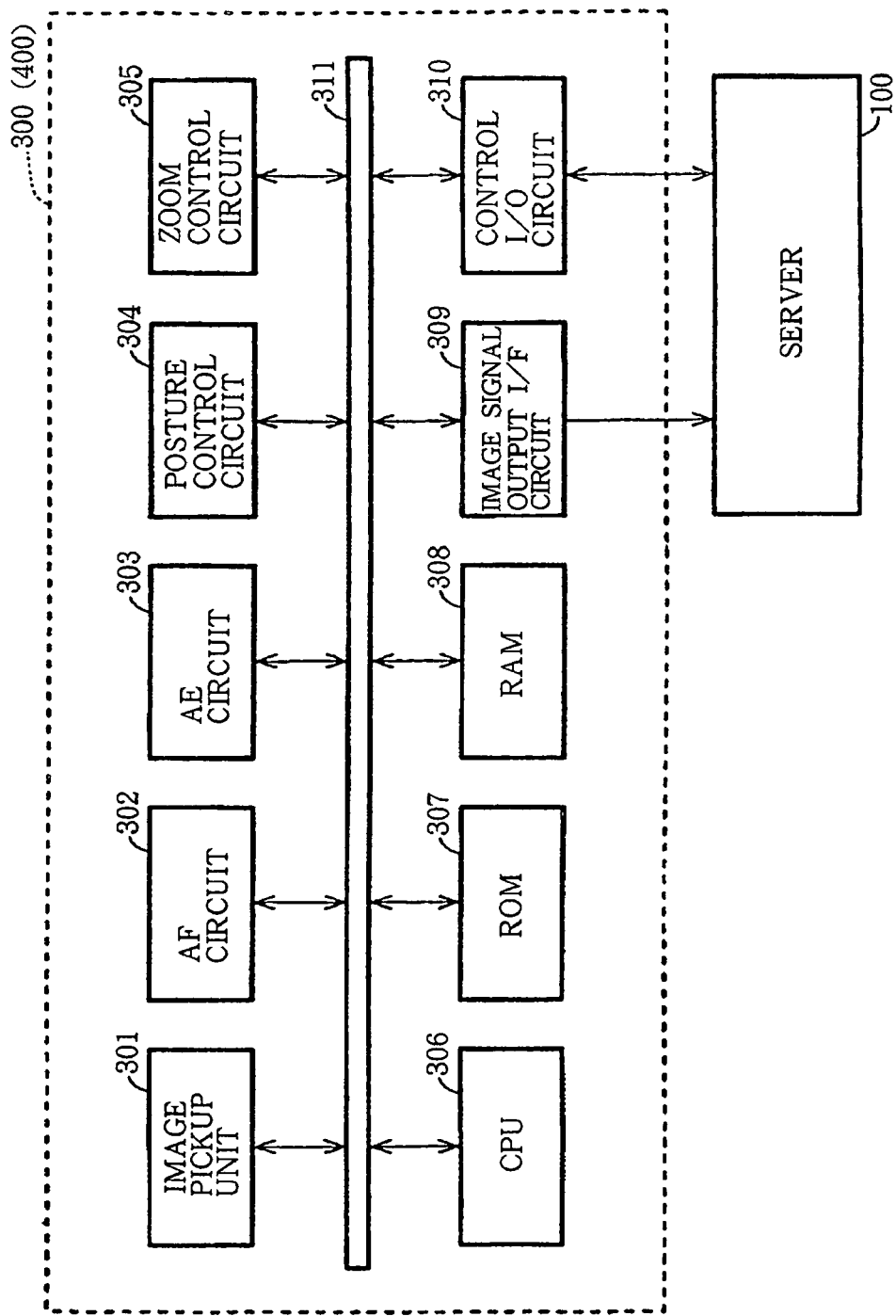
FIG. 3 is a block diagram showing each internal constitution of a first camera and a second camera of aforesaid system.

FIG. 3 is a block diagram showing each internal constitution of the first camera 300 and the second camera 400 which are connected to the server 100 as mentioned above.

Herein the first camera 300 and the second camera 400 are similarly constituted to each other. In FIG. 3 mentioned above, the internal constitutions is illustrated especially regarding the first camera 300.

As can be seen from FIG. 3, the first camera 300 comprises an image pickup unit 301, an automatic focusing (referred to as "AF") circuit 302, an automatic exposing (referred to as "AB") circuit 303, a posture control circuit 304, a zoom control circuit 305, a CPU 306, a ROM 307, a RAM 308, an image output I/F circuit 309 and a control signal I/O circuit 310, which are interconnected through a bus 311 to each other. The image output I/F circuit 309 and the control signal I/O circuit 310 are further connected to the server 100, respectively.

The image pickup unit 301 includes a lens unit (namely, a focusing lens, a lens in use for a zoom control etc.), a shutter and an iris diaphragm and a charge coupled device (referred to as "CCD") for photo-electrically converting an optical image of a subject incident through the aforesaid optical accessaries into an electric signal (namely, image signal).

The AF circuit 302 performs an automatic focusing control of the image pickup unit 301. Actually, the AF circuit 302 performs, for instance, a sort of control (namely, the AF control) by means of extracting high-frequency components out of the image signals output from the CCD and by means of maximizing the extracted components, thereby to drive the lens to move toward a location wherein the image pickup unit 301 generates a sharpest image.

A pulse value of a motor which serves to drive the lens for focusing is used herein as a parameter for the AF control.

The AE circuit 302 performs an automatic exposure control of the image pickup unit 301. Actually, the AE circuit 303 performs, for instance, another sort of control (namely, the AE control) by means of controlling a shutter speed and an opening of the iris diaphragm so that an adequate light quantity will be introduced into the CCD.

The shutter speed and the iris diaphragm value are used herein as parameters (namely, information about exposure) for the AE control. A brightness of the image is decided by combination of the shutter speed value with the iris diaphragm value.

The posture control circuit 304 performs a posture control of an image sensing direction of the camera such as panning, tilting etc. The posture control is performed dependently upon the camera control instruction delivered from the server 100.

Another pulse number of another motor which is employed for driving a universal head installed on a main body of the camera to be described later is used herein as a parameter for the posture control.

The zoom control circuit 305 controls a zooming rate of the camera, dependently upon the camera control instruction delivered from the server 100.

Still another pulse number of still another motor which is employed for driving the lens in use for zoom control is used herein as a parameter for the zoom control.

The CPU 306 is in use for totally controlling various operations totally allocated to the first camera 300 by means of reading out the processing programs, which are preliminarily stored in the ROM 307, writing in the RAM 308 and executing the written processing programs. The CPU 306 provides the image sensing unit 301, the AF circuit 302, the AE circuit 303, the posture control circuit 304 and the zoom control circuit 305 with, for instance, the control signals in use for various sorts of operations and drives each circuit to perform adequate processing steps, corresponding to the camera control command output from the server 100.

In the ROM 307, various sorts of processing programs, whereby the CPU 306 executes the processing steps, are preliminarily stored.

The RAM 308 provides the CPU 306 with still another work area, wherein said processing programs are to be executed, and with still another temporary buffer area, wherein the image signals output from the image pickup unit 301 and the camera control instructions etc. output from the server 100 are to be temporarily stored.

The image signal output I/F circuit 309 is connected to the image signal input I/F circuit 102 on the server 100 and provides server 100 with image data which are produced by applying specified signal processing steps such as a compression etc. to the image signal output from the image pickup unit 301.

The control I/O circuit 310 is connected through a cable such as a specification of RS232C etc. to the switching device 500 to be detailed later and performs the data communication of the video control instructions and transmission/receiving of information about the various sorts of camera parameters mentioned above between the server 100.

Figure 4A:
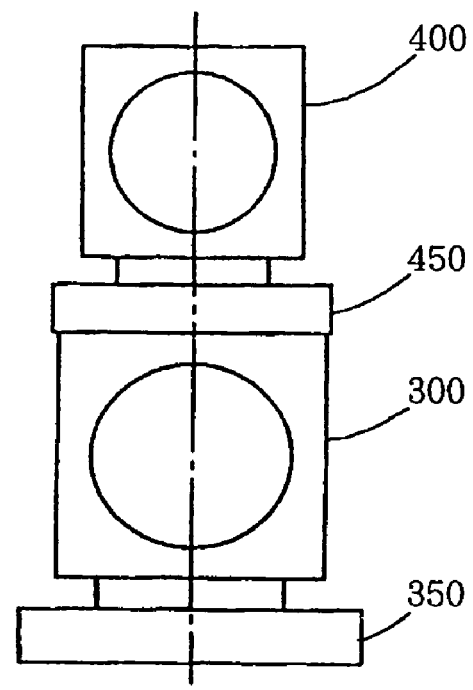
FIGS. 4A and 4B are a front and a side views, respectively, for illustrating a locational relationship between the first and the second cameras.
Figure 4B:
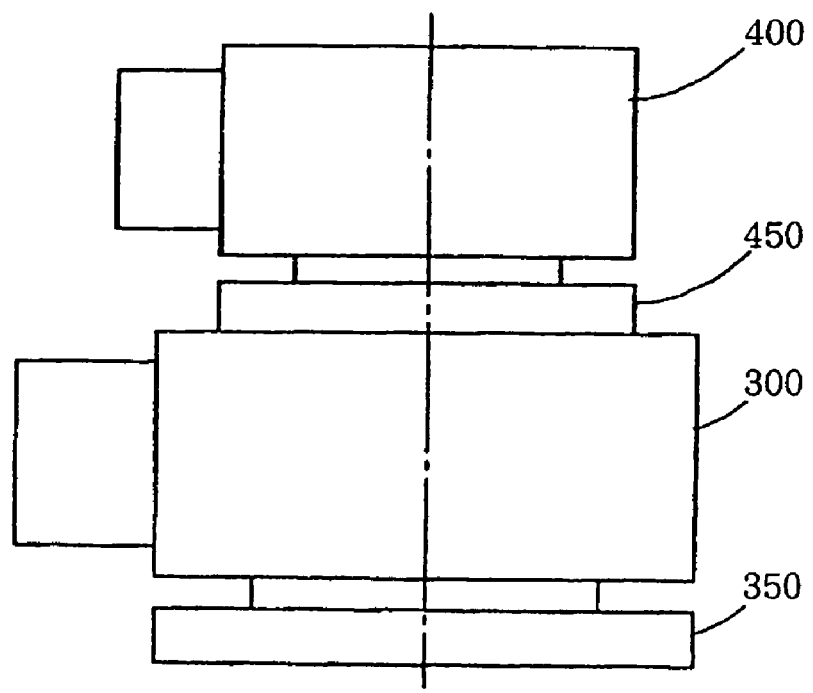

The first camera 300 and the second camera 400 mentioned above are set in a locational relationship as shown in FIGS. 4A and 4B.

FIG. 4A mentioned above is a front view of the first camera 300 and the second camera 400, wherein the second camera 400 is set above the first camera 300 as can be seen from the figures. The panhead 450 of the second camera 400 is fixed to the main body of the first camera 300 so that a relative locational relationship of the second camera 400 is kept invariably with respect to the subject to be picked up even if the posture of the first camera 300 varies during panning or tilting.

On the other hand, FIG. 4B mentioned above is a side view of the first camera 300 and the second camera 400 for illustrating herein a situation, wherein panning axes of the first camera 300 and second camera 400 are the same.

In the first camera 300 and the second camera 400 which are set in the locational relationship as mentioned above, the first camera 300 is employed as a wide-angle image pickup camera in use for sensing a relatively wide-angle image while the second camera 400 is employed as a telephoto-angle image pickup camera in use for sensing an image having a high zooming rate. The posture control of the second camera 400 is performed so that an image pickup range of the second camera 400 does not exceed another image pickup range of the first camera 300. Those situations are illustrated in FIGS. 5A and 5B.

Figure 5A:
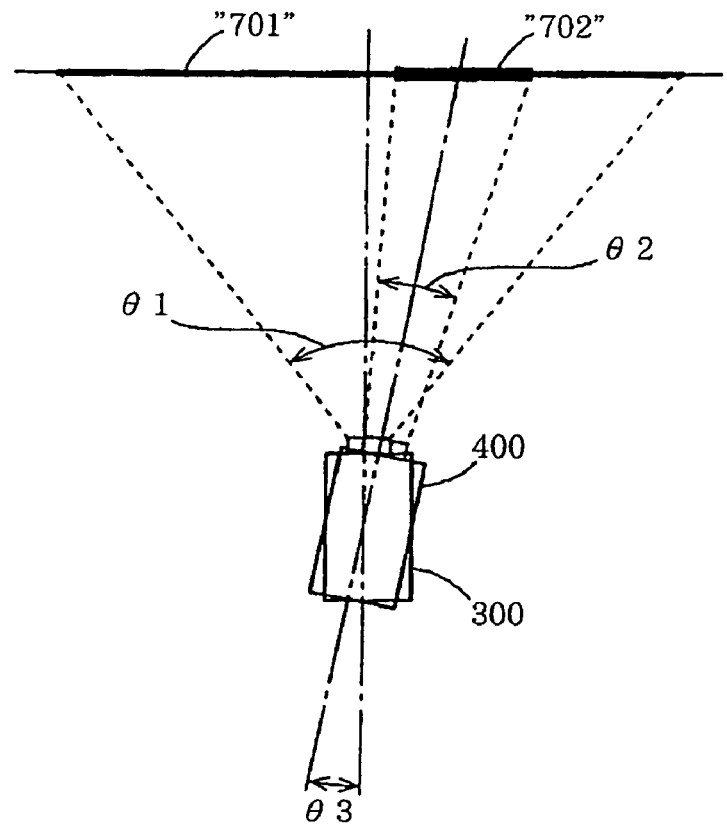
FIGS. 5A and 5B are a plan view and a side view, respectively, for illustrating a relationship between an image sensing range of the first camera and another image sensing range of the second camera.
Figure 5B:
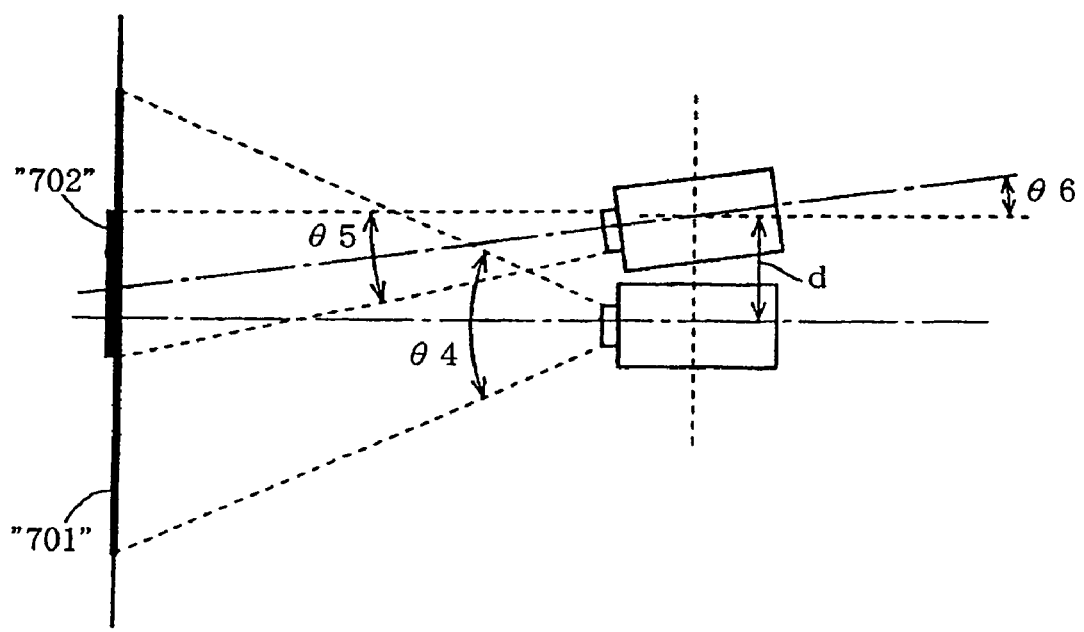

First, FIG. 5A shown above is a conceptual plan view of the first camera 300 and the second camera 400, wherein angular fields of view are actually represented by $\theta 1$ for the first camera 300 and by $\theta 2$ for the second camera 400, respectively, in accordance with the zooming rate of each camera.

A character "$\theta 3$" shown in FIG. 5A stands for a relative angular difference in image pickup direction between the first camera 300 and the second camera 400 which is induced by panning. Further, a numeric sign "701" stands for the image pickup range of the first camera 300 and "702" stands for the image pickup range of the second camera 400.

To keep the image pickup range "702" of the second camera 400 within the image sensing range "701" of the first camera 300, $\theta 1$, $\theta 2$ and $\theta 3$ are herein controlled so as to satisfy an equation shown as follows:

$$\theta 1 = \theta 2 + (\theta 3 \times 2)$$

On the other hand, FIG. 5B shown above is a conceptual side view of the first camera 300 and the second camera 400.

Herein each angular field of view $\theta 4$ and $\theta 5$ of the first camera 300 and the second camera 400, respectively, together with a relative angular difference $\theta 6$ in image pickup direction between the first camera 300 and the second camera 400, the latter of which is induced by tilting, are to be controlled so as to satisfy another equation wherein a distance d between two viewpoints of the cameras is taken into consideration because the first camera 300 and the second camera 400 are set in the locational relationship (namely, in a stacked status) as shown in FIG. 4B.

Each constitution of the present system has been described up to now. Subsequently, external operations of the present system are to be described.

Each of Clients 200 (1), 200 (2), . . . , 200 (x), cannot always control, for instance, the second camera 400 but each client can control the second camera 400 after acquiring its control right. Hereinafter described are the operations of the present system on that occasion.

Figure 6:
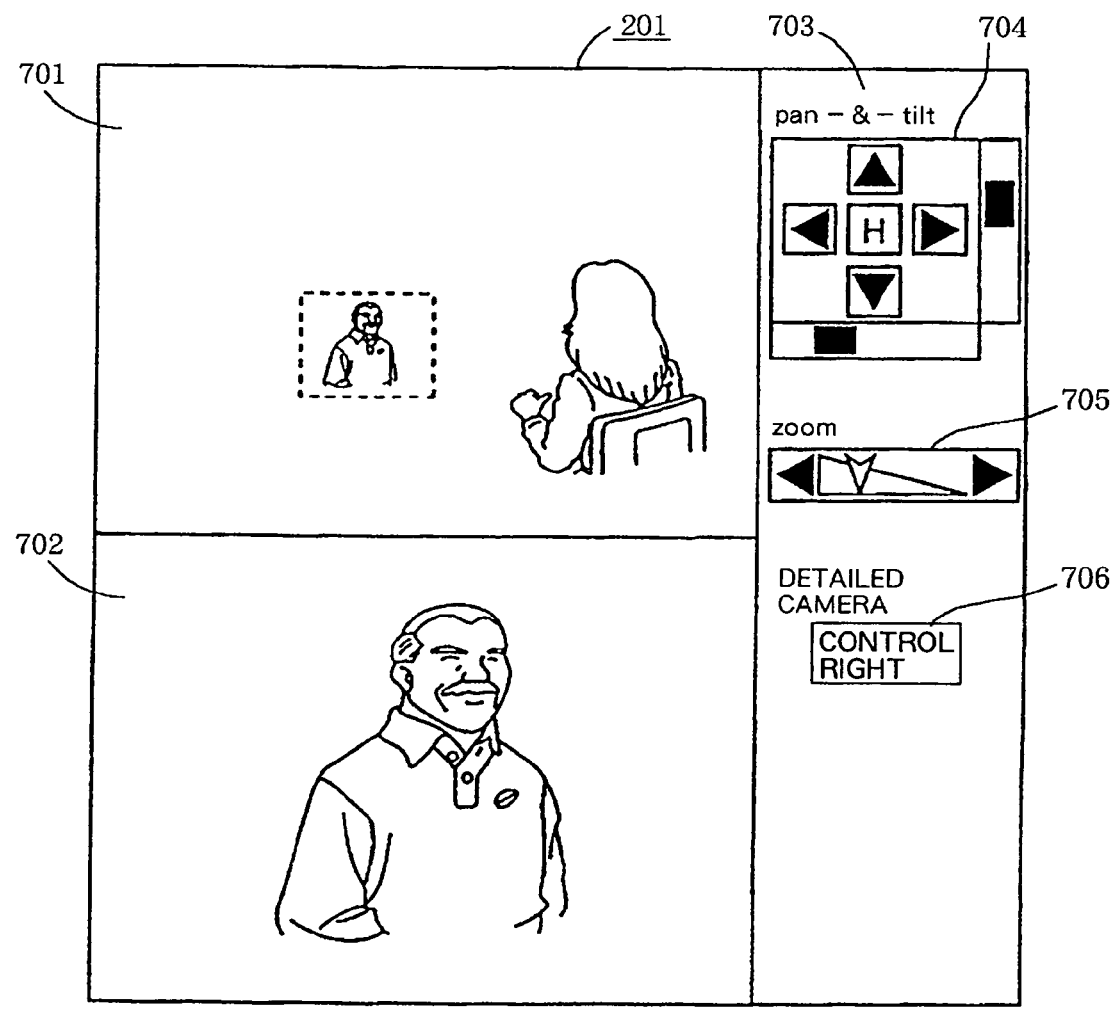
FIG. 6 is a view showing an image plane seen from a client side.

On each screen of displays 201 which belong to Clients 200 (1), 200 (2), . . . , 200 (x), . . . shown in FIG. 2, is displayed a first image display area 701 wherein the image signal output from the first camera 300 is to be displayed, a second image display area 702 wherein the image signal output from the second camera 400 is to be displayed and a control panel 703 as can be seen from FIG. 6.

The control panel 703 is arranged with various sorts of control buttons for controlling the first camera 300 (they are a "pan-&-tilt" button 704 and a "zoom" button 705 herein) and a control button 706 for acquiring and relinquishing the control right of the second camera 400.

Figure 7:
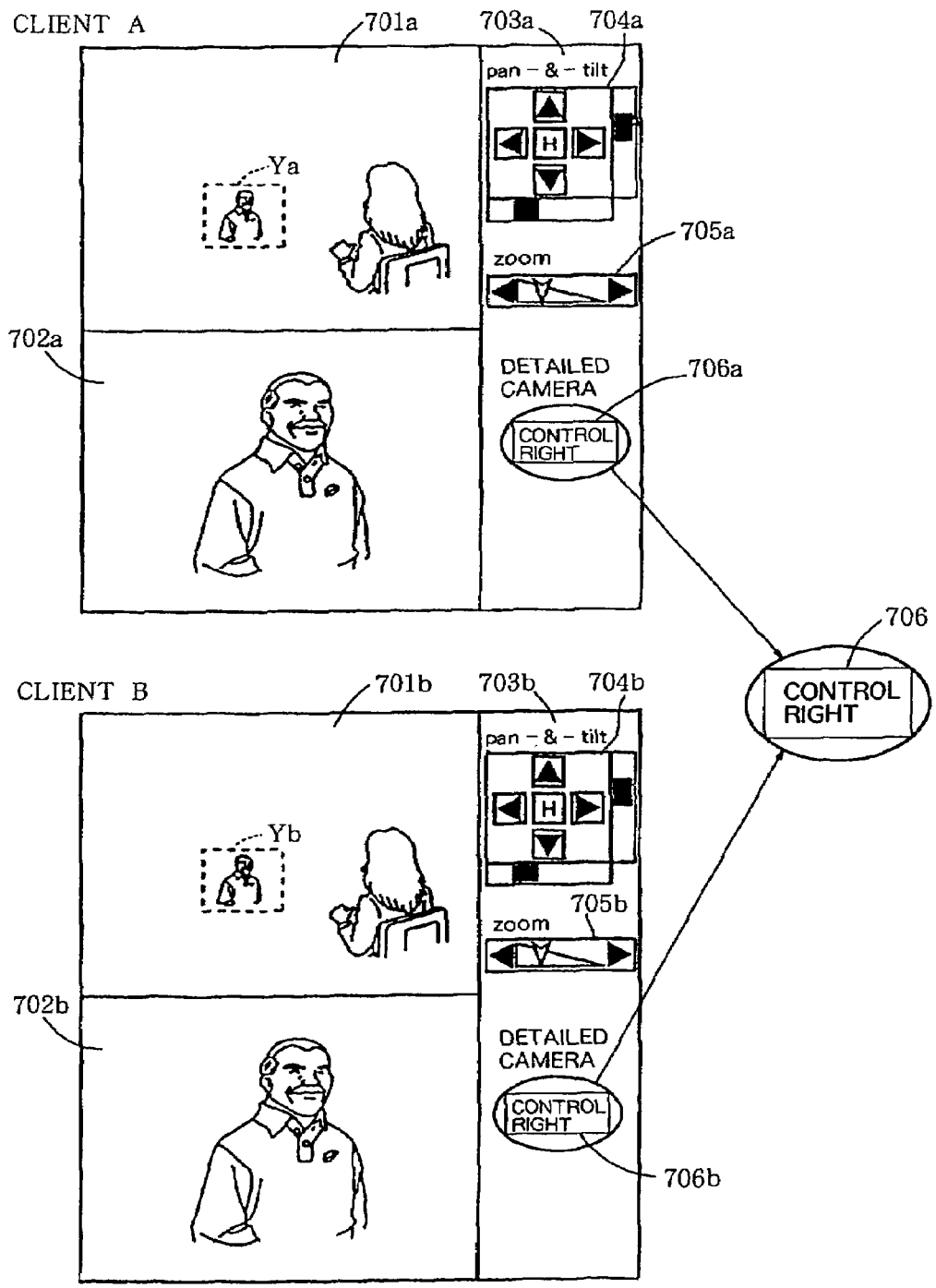
FIG. 7 is a view showing the image planes when both client A and client B have not acquired a control right to control the second camera.

FIG. 7 is a view showing two screens of the two displays 201 of Clients A and B among the plurality of Clients 200 (1), 200 (2), . . . , 200 (x), . . . shown in FIG. 1. Herein the two clients have not acquired any control right to control the second camera 400 yet.

Incidentally, to distinguish the constitutions that belong to Client A from those that belong to Client B, the numeric signs of the constitutions are attached with suffixes "a" and "b" during description.

As both clients have not acquired any control right yet, both control buttons 706*a* and 706*b* are displayed with black characters in a white background as shown in FIG. 7. [706'] shown in FIG. 7 is an enlarged view of either the control button 706*a* or 706*b*.

Both "pan-&-tilt" buttons 704*a* and 704*b* together with both "zoom" buttons 705*a* and 705*b* for controlling the first camera 300 are all displayed with solid lines.

Further, the image pickup ranges of the second camera 400 are displayed with yellow frames Ya and Yb in respective image display areas 701*a* and 701*b*.

On that status mentioned above, both Client A and B can control the first camera 300. Each user controls the first camera 300 through employing the "pan-&-tilt" buttons 704*a* and 704*b* together with the "zoom" buttons 705*a* and 705*b* which are arranged on the control panels 703*a* and 703*b*. However, both users cannot control the second camera 400 because they have not acquired the control right of the second camera 400 yet.

Figure 8:
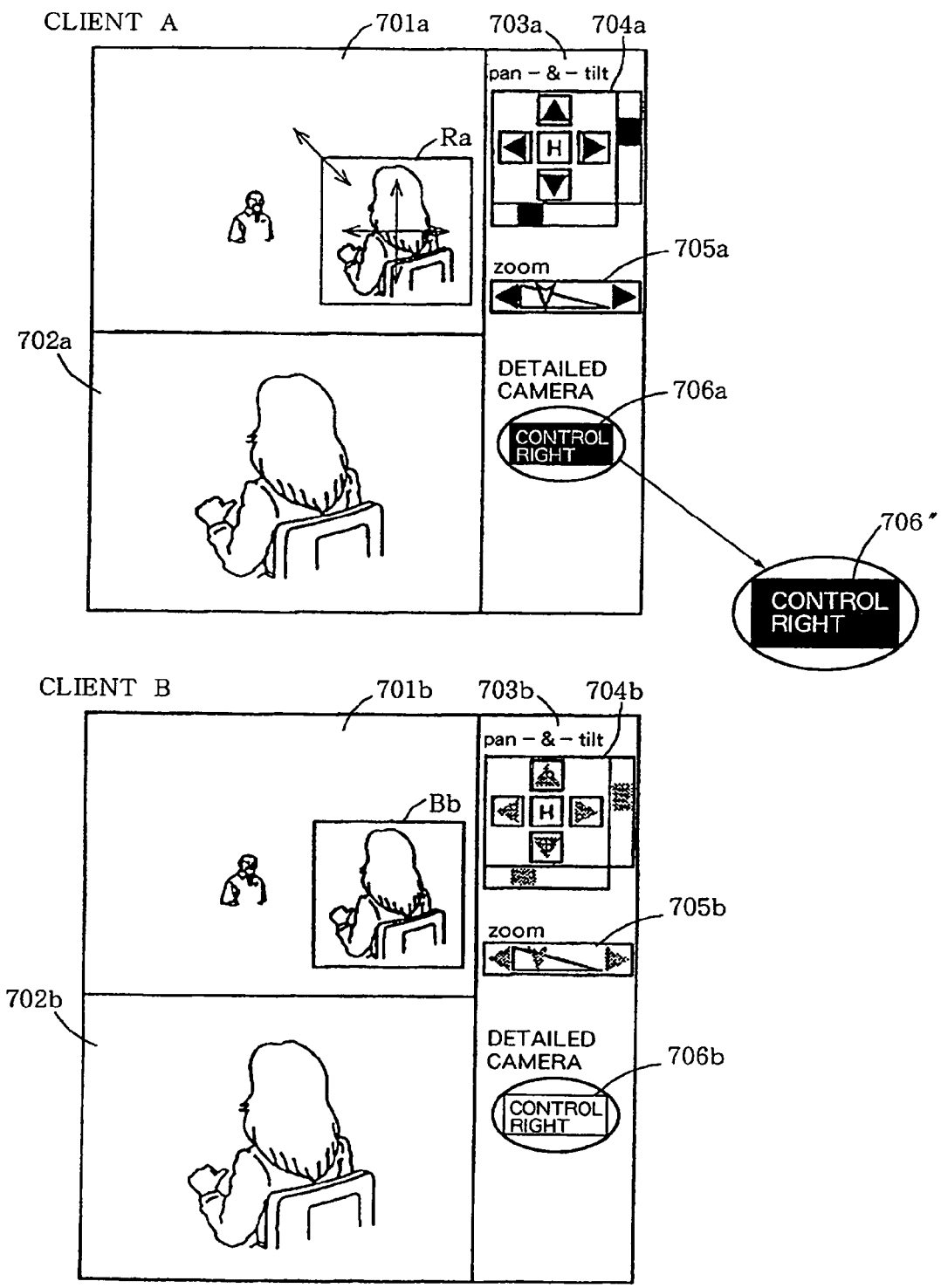
FIG. 8 is a view showing the image planes when client A has acquired the control right of the second camera.

Then, if the user toggles down the control right button 706*a*, for instance, by means of the input device 202*a* (the pointing device such as the mouse) on the display 201*a* of Client A, thereby acquiring the control right of the second camera 400, the control right button 706*a* is displayed with white characters in a black background as shown in FIG. 8 on the contrary. [706"] shown in the figure is an enlarged view of the control right button 706*a* on that occasion.

As mentioned above, acquisition and relinquishment of the control right are completed by manipulation of the control right button 706*a* through the input device 202*a*.

By performing as mentioned above, the image pickup range of the second camera 400 is displayed with a red frame Ra in the image display area 701*a* of Client A.

During that, the "pan-&-tilt" button 704*a* and the "zoom" button 705*a* for controlling the first camera 300 are kept displayed with the solid lines.

On the other hand, the image pickup range of the second camera 400 is displayed with a blue frame Bb in the image display area 701*b* of the display 201*b* that belongs to Client B which has not acquired the control right of the second camera 400.

Herein the "pan-&-tilt" button 704*b* and the "zoom" button 705*b* of Client B for controlling the first camera 300 are displayed in a grayout tone.

Namely, on the display of Client A which has acquired the control right of the second camera 400, the frame Ra for defining the image pickup range of the second camera 400 is displayed in red lines on the image plane area 701*a* as shown in FIG. 8 and the various sorts of buttons for controlling the first camera 300 are displayed with the solid lines on the control panel 703*a*, thereby indicating capability of controlling both the first camera 300 and the second camera 400.

On the contrary, on the display of Client B which has not acquired the control right of the second camera 400, the frame Rb for defining the image pickup range of the second camera 400 is displayed in blue line on the image display area 701*b* and the various sorts of buttons for controlling the first camera 300 are displayed in the grayout tone, thereby indicating incapability of controlling both the first camera 300 and the second camera 400.

As mentioned above, an acquiring status of the control right of the second camera 400 by the client is indicated by changing the color of the frame for defining the image pickup range of the second camera 400. Only when the frame color is red, it is possible to control the second camera 400.

When the frame color is blue, it is indicated that one of the other clients has acquired the control right to control the second camera 400. Incidentally, when the frame color is yellow, it is indicated that no client has acquired the control right of the second camera 400.

Accordingly, when Client A has acquired the control right of the second camera 400, the user of Client A can carry out the posture control and the zoom control of the first camera 300 by manipulating, for instance, the "pan-&-tilt" button 704a and the "zoom" button 705a. Simultaneously, he can perform the posture control of the second camera 400 by means of dragging the red frame Ra for defining the image pickup range of the second camera 400 with the pointing device such as the mouse etc. Similarly, he can perform the zoom control of the second camera 400 by changing a size of the red frame Ra by the pointing device.

According to the present system as mentioned above, when Client A acquires the control right of the second camera 400, Client B cannot control both the first camera 300 and the second camera 400. Namely, once a certain client acquires the control right of the second camera 400, all clients except for the certain client turn incapable of controlling both the first camera 300 and the second camera 400.

The reason why is that the second camera 400 of which control right has been acquired by the certain client is moved by the first camera 300 if any other clients except for the certain client control the first camera 300. The present system is constituted so as to protect operations of the client, which has acquired the control right, against obstruction caused by the other clients.

Those constitutions mentioned above are the most characteristic properties of the present system.

Furthermore, the control right of the second camera 400 turns incapable of being acquired by the other clients anymore even if the control right button is pushed down until the client, which has acquired the control right, relinquishes the control right by means of toggling down the button again.

It has been described about a case when the control right of the first camera 300 is simultaneously acquired so long as the control right of the second camera 400 is once acquired. Further, to limit a control range of the first camera 300 turns capable so that the posture control range of the first camera 300 does not exceed the image pickup range of the second camera 400.

This control method can be realized by means of computing the geographical relationship illustrated with reference to FIGS. 5A and 5B mentioned above.

Hereinafter described are internal operations of the present system.

1. Main Processings of the Server 100

Figure 9:
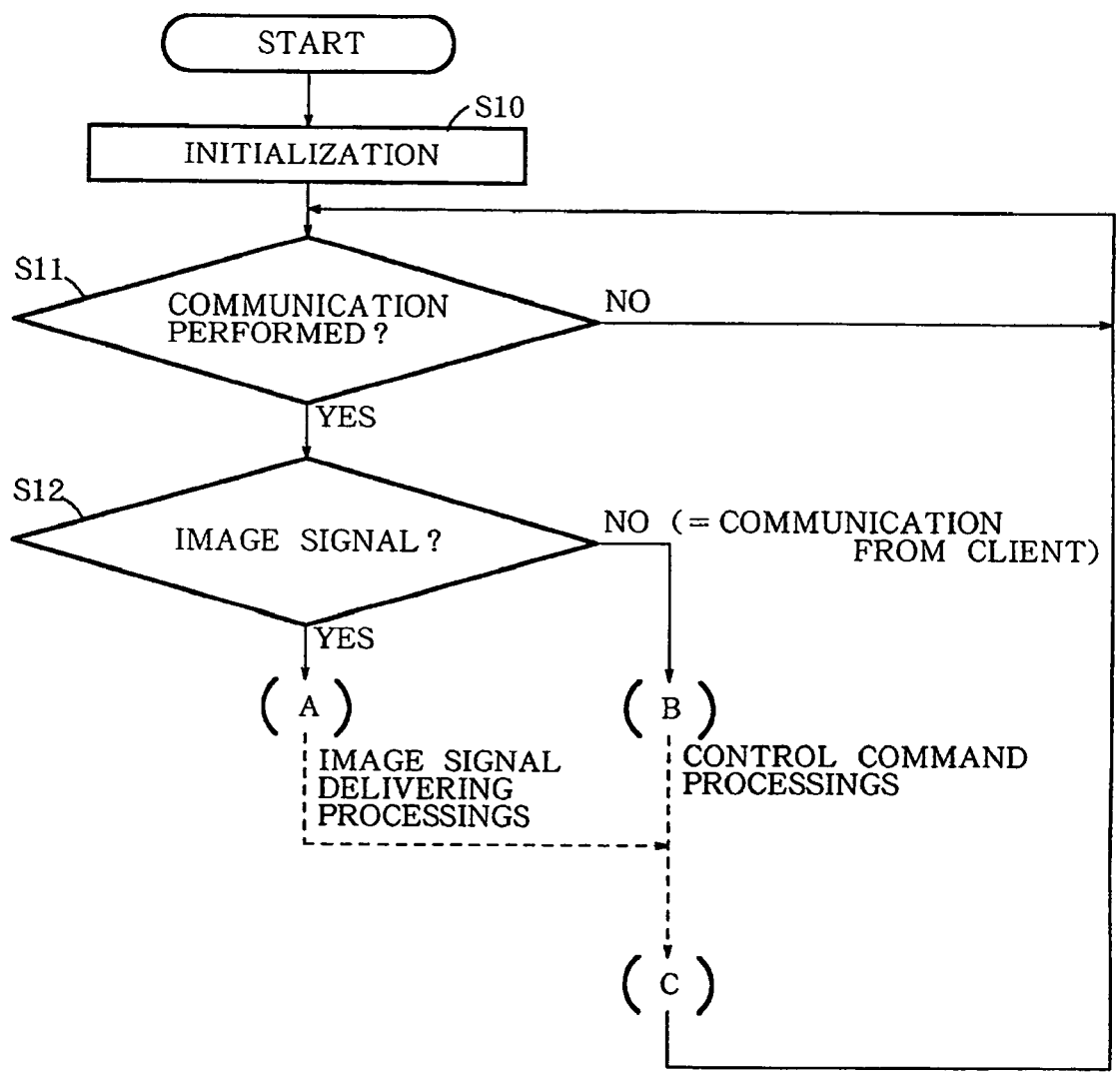
FIG. 9 is a flowchart for illustrating main processing steps of the server.
Figure 10:
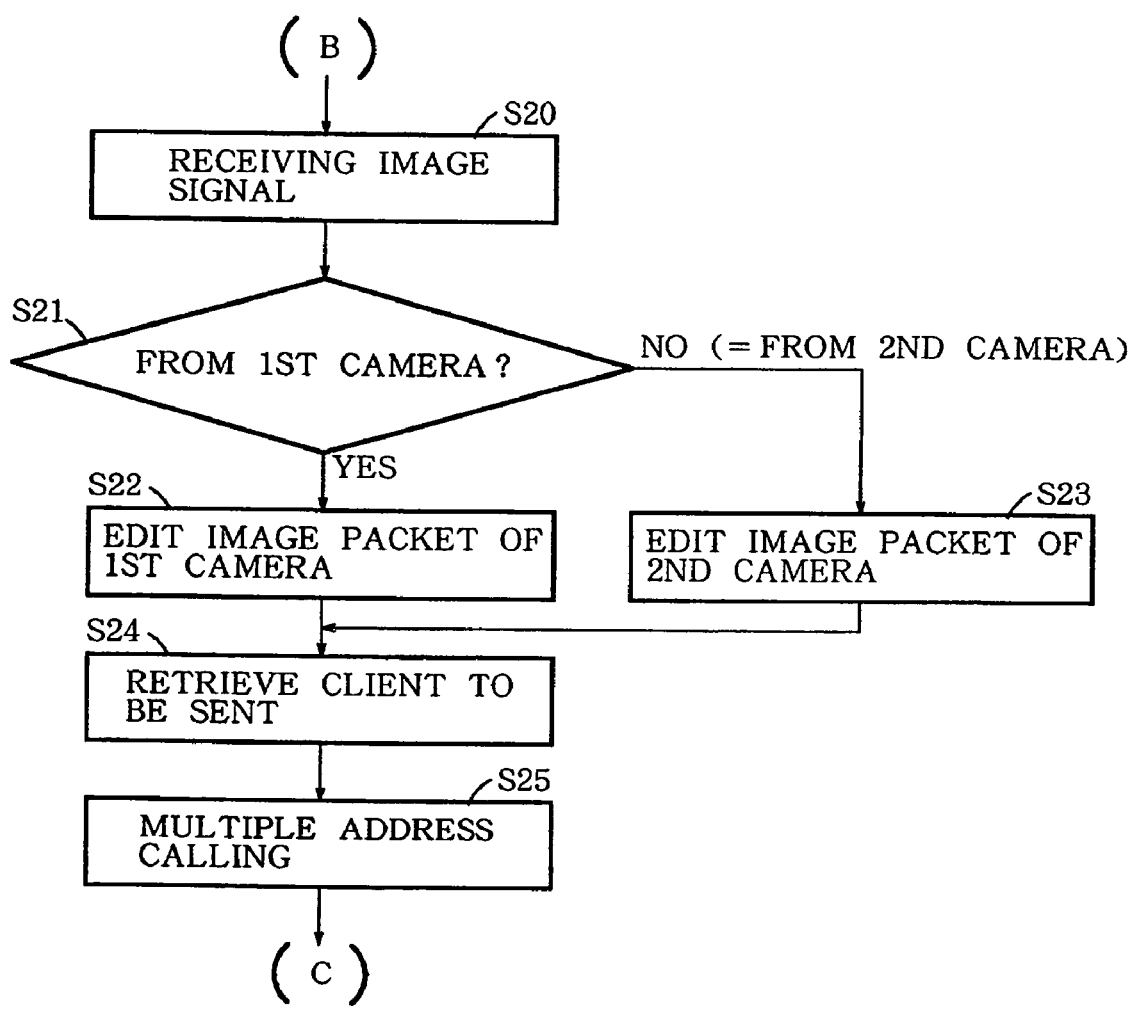
FIG. 10 is a flowchart for illustrating processing steps performed in aforesaid main processing steps when the server receives an image signal from the camera.
Figure 11:
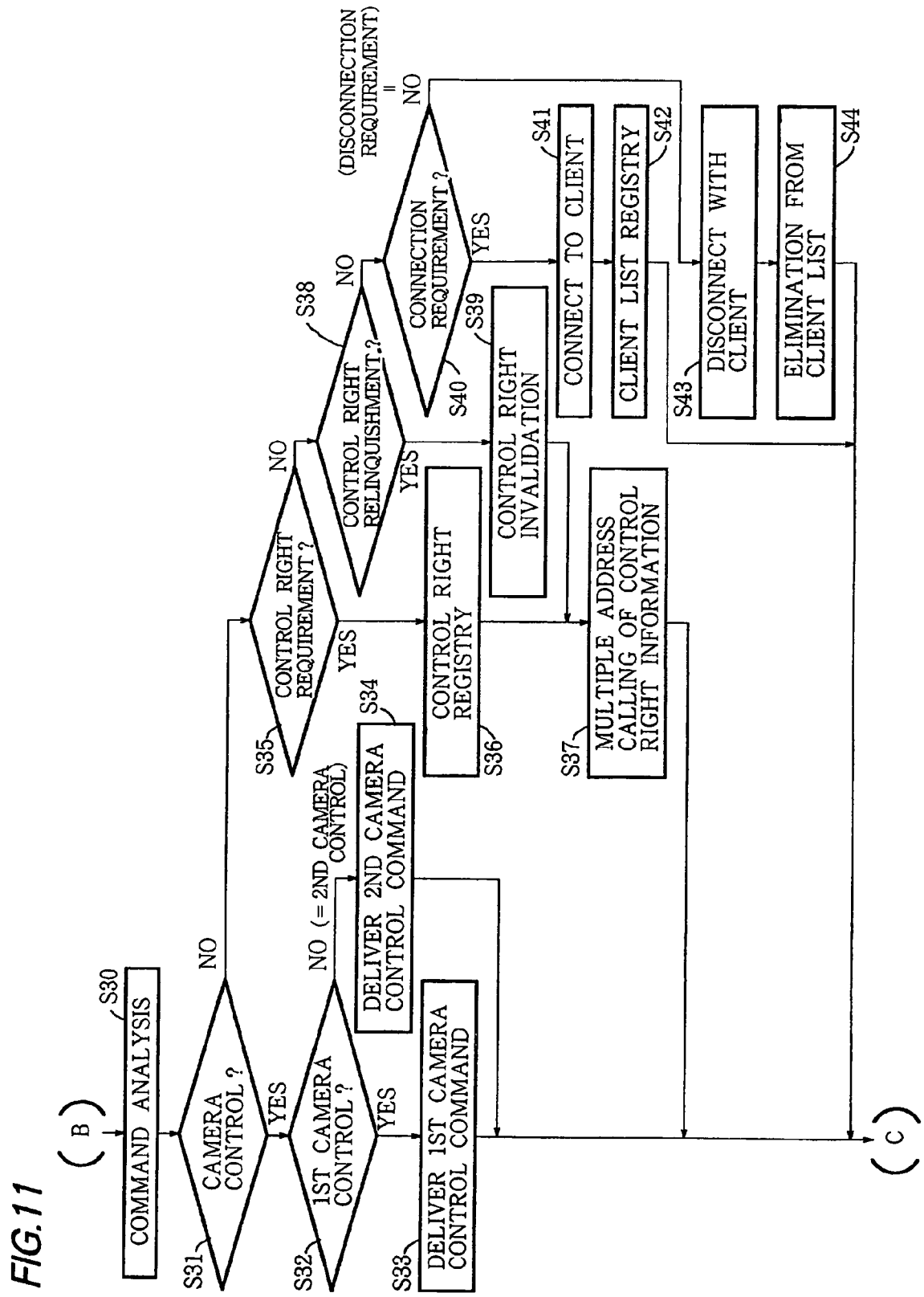
FIG. 11 is a flowchart for illustrating the processing steps performed in aforesaid main processing steps when the server receives a command from the client.

In the ROM 104 of the server 100, the processing programs which follow the flowcharts shown in FIGS. 9-11 are preliminarily stored. Reading-out and executing the stored processing programs by the CPU 101 drives the server 100 to operate as follows:

First, when the server 100 is started as shown in FIG. 9 mentioned above, an initialization processing is performed in the server 100 (Step S10).

For instance, the CPU 101 reads out the main processing programs etc., which are stored in the ROM 104 and necessary for performing the processings, to write them in the RAM 105. On the other hand, the CPU 101 prepares for performing the data communication through the image input I/F circuit 102 and the control I/O circuit 103 with the first camera 300 and the second camera 400. Further, the CPU 101 initializes various sorts of variables used for executing the processing steps.

Next, the CPU 101 passes a judgment whether an actual communication is performed or not, by using the image input I/F circuit 102, the control I/O circuit 103 and the communication I/F circuit 106 (Step S11). The processing step executed at the Step S11 is repeated until the actual communication is detected.

If the communication is determined that it is performed at Step S11, the CPU 101 passes another judgment whether one of the image signals is output from the first camera 300 and the second camera 400 or not (Step S12).

If the judgment passed at Step S12 determines that the communication is one of the image signals output from the first camera 300 and the second camera 400, the processing step treads in an image signal processing path which begins with (A) to be detailed later. If, otherwise, the judgment result is neither of those image signals, it is determined as a communication from the client so that the processing step treads in a control command processing path which begins with (B) to be detailed later.

When either the image signal processing steps of Path (A) or the control command processing steps of Path (B) are finished and then the processing flow returns to (C), the processing steps beginning with Step S11 are repeated again.

1-1. Image Signal Processings Starting from (A)

(cf. FIG. 10 Shown Previously)

When the server 100 receives the image signal delivered either from the first camera 300 or from the second camera 400, first the CPU 101 stores aforesaid image signals, which is received through the image input I/F circuit 102, in the RAM 105 (Step S20).

Next, the CPU 101 determines as to whether the image signal stored in the RAM 105 is output from the first camera 300 or not (Step S21).

If the determination result at Step S21 indicates that the signal is output from the first camera 300, the CPU 101 produces a packet on the basis of the image signal, output from the first camera, stored in the RAM 105 and stores said packet, which is to be transferred to the client, again in the RAM 105 (Step S22). If it indicates otherwise, namely that the signal is output from the second camera 400, the CPU 101 produces another packet on the basis of the image signal, output from the first camera, stored in the RAM 105 and stores said packet, which is to be transferred to the client, again in the RAM 105 (Step S23).

After the processing step of either Step S22 or Step S23 is finished, the CPU 101 retrieves the clients to be provided with the image signal, namely Clients 200 (1), 200 (2), . . . , 200 (x), . . . which are connected to the network 600 (Step S24).

Incidentally, the system is constituted so that information about Client 200 (x) is to be registered on a client list formed in the RAM 105 of the server 100 if Client 200 (x) is connected to the server 100 as shown in FIG. 2. Accordingly, the CPU 101 retrieves the client to be provided with the image signal by means of referring to the client list.

Then the CPU 101 transmits the packet (image signal packet), which is stored again in the RAM 105 either at Step S22 or at Step S23, through the communication I/F circuit 106 to the client, which is retrieved at Step S24 (Step S25).

After that, the step returns to (C) of the main processings shown in FIG. 9 mentioned above.

1-2. Control Command Processing Starting from (B)
(cf. FIG. 11 Shown Previously)

When the server 100 receives the communication from any of the clients, the CPU 101 first analyzes the command which is received through the communication I/F circuit 106 from the client (Step S30).

If a result of the analysis carried out at Step S30 indicates that the command provided from the client is the "camera control" one (Step S31), the CPU 101 further passes a judgment whether said command is in use for controlling the first camera 300 or not (Step S32).

If the judgment passed at Step S32 indicates that the command is in use for controlling the first camera 300, the CPU 101 provides the switching apparatus 500 through the control I/O circuit 103 with the switching control signal for switching the targeted instrument to the first camera 300. The CPU 101 then transmits the received command through the same circuit to the first camera 300. Performing the operations mentioned above, the command received at the server 100 is transferred through the switching apparatus 500 to the first camera 300 (Step S33).

On the contrary, if the judgment passed at Step S32 indicates that the command is not in use for controlling the first camera 300, namely that the command is in use for controlling the second camera 400, the CPU 101 provides the switching apparatus 500 through the control I/O circuit 103 with the switching control signal for switching the targeted instrument to the second camera 400. The CPU 101 then transmits the received command through the same circuit to the second camera. Performing the operations mentioned above, the command received at the server 100 is transferred through the switching apparatus 500 to the second camera 400 (Step S34).

After processing either Step S33 or Step S34, the processing flow returns to (C) of the main processing shown in FIG. 9 mentioned above.

On the other hand, if the command output from the client is determined as not in use for "camera control" at Step S31, the CPU 101 further determines whether the command is for acquiring the control right of the second camera 400 or not (Step S35).

If the determination resulted at Step S35 indicates that the command is for acquiring the control right of the second camera 400, the CPU 101 produces the packet formed of information notifying to granting the client, which has output said command, with the control right of the second camera 400 (Step S36). The CPU 101 then retrieves the clients, which are connected to the network 600, similarly to Steps S24 and S25 previously shown in FIG. 10 and transmits the packet produced at S36 to the retrieved clients (Step S37).

Then the processing flow returns to (C) shown in FIG. 9 mentioned above.

On the contrary, if the determination resulted at Step S35 indicates that the command is not in use for acquiring the control right of the second camera 400, the CPU 101 passes a judgment whether said command is in use for relinquishing the control right (that has been acquired) to control the second camera 400 or not (Step S38).

If the judgment passed at Step S38 indicates that the command is for relinquishing the control right of the second camera 400, the CPU 101 produces the packet formed of information notifying that the control right of the second camera 400 is relinquished (Step S39). The CPU 101 then executes Step S37 mentioned above to deliver the packet produced at Step S39 to the clients, which are connected to the network 600, by means of the multiple address calling communication.

After that, the processing flow returns to (C) of the main processing shown in FIG. 9 mentioned above.

On the contrary, if the judgment passed at Step S38 indicates that the command is not in use for relinquishing the control right of the second camera 400, the CPU 101 determines whether said command is for requiring connection or not (Step S40).

If the determination resulted at Step S40 indicates that the command is for requiring connection, the CPU 101 performs a processing step of connecting the network with the client, which has output said command for requiring connection (Step S41), and registers the client on the client list mentioned previously (Step S42). After that, the process flow returns to (C) of the main processing shown in FIG. 9 mentioned above.

On the other hand, if the command is for requiring disconnection, the CPU 101 performs a processing step of disconnecting the network with the client, which outputs said command for requiring disconnection (Step S43), and eliminates the client name from the client list mentioned previously (Step S44). After that, the process flow returns to (C) of the main processing shown in FIG. 9 mentioned above.

2. processings Performed in Clients

Herein described are operations of clients especially with reference to Client 200 (x) for abbreviation of description because Clients 200 (1), 200 (2), . . . , 200 (x), . . . are similarly constituted.

Figure 12:
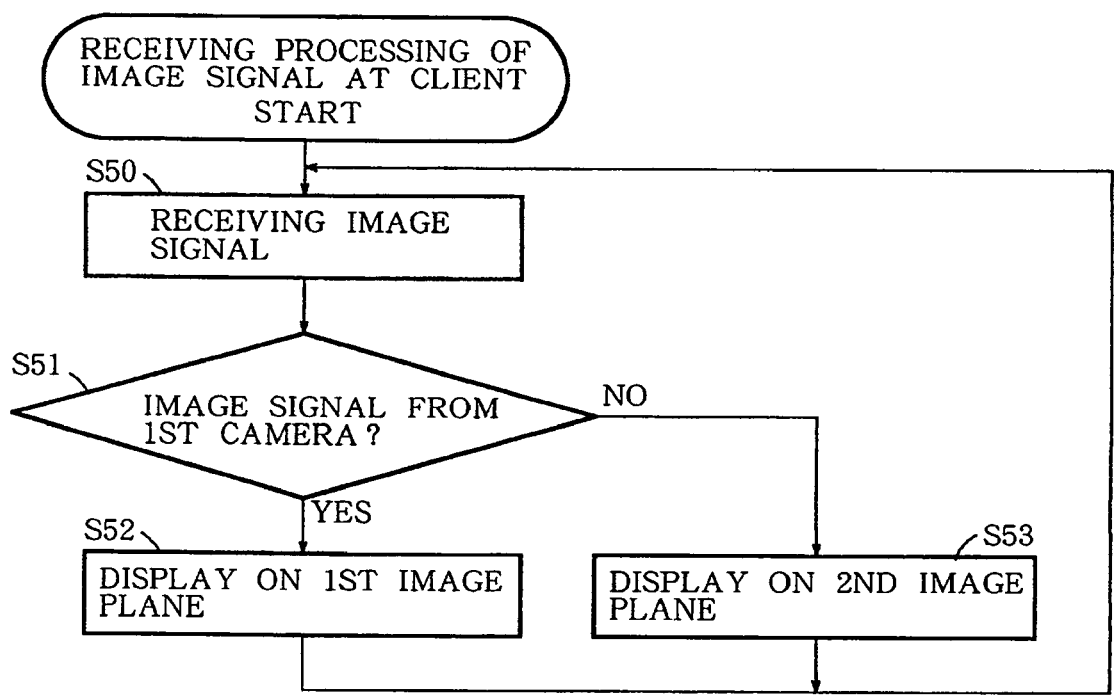
FIG. 12 is a flowchart for illustrating the processing steps when the client receives an image signal from the server.
Figure 13:
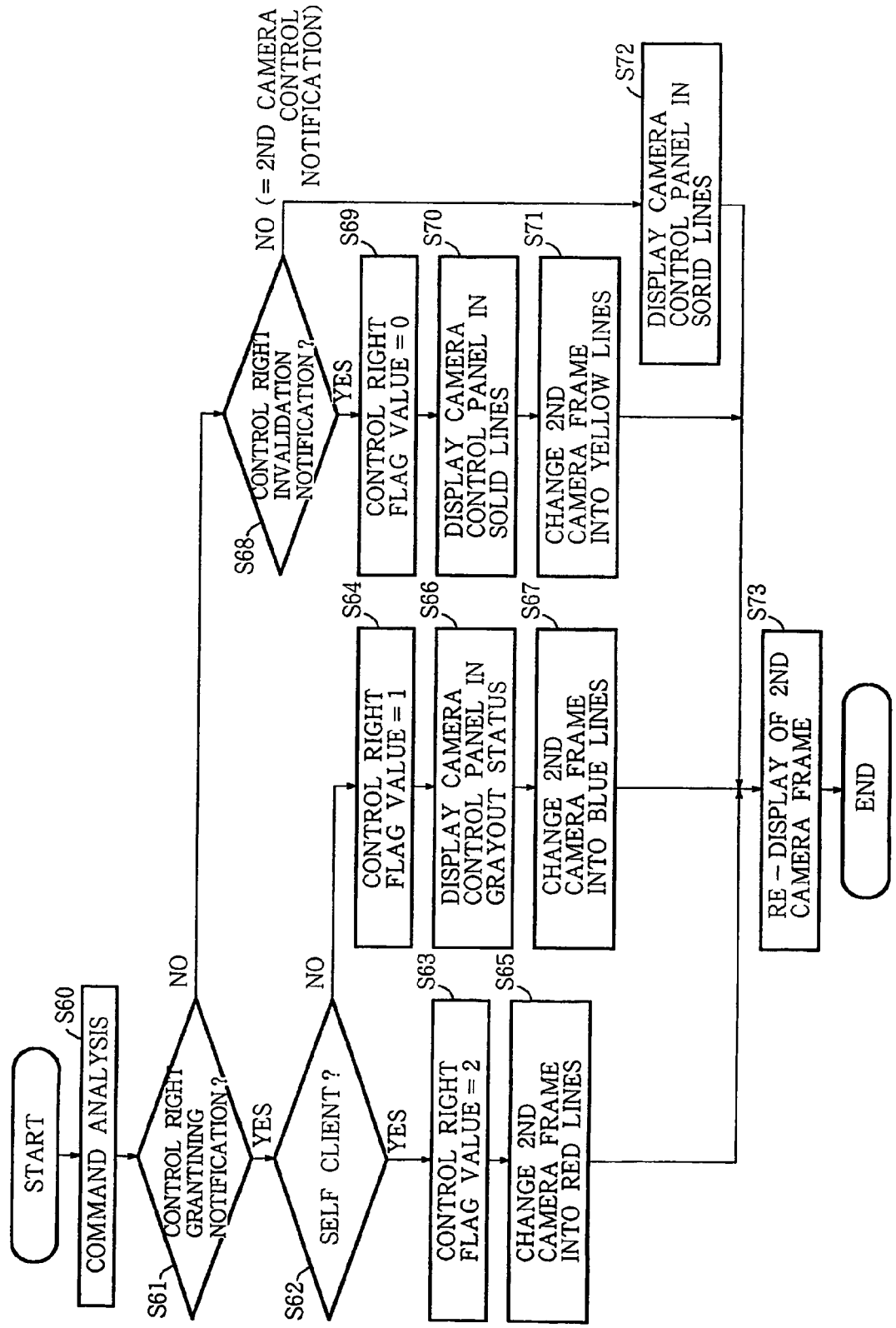
FIG. 13 is a flowchart for illustrating the processing steps when the client receives the command from the server.
Figure 14:
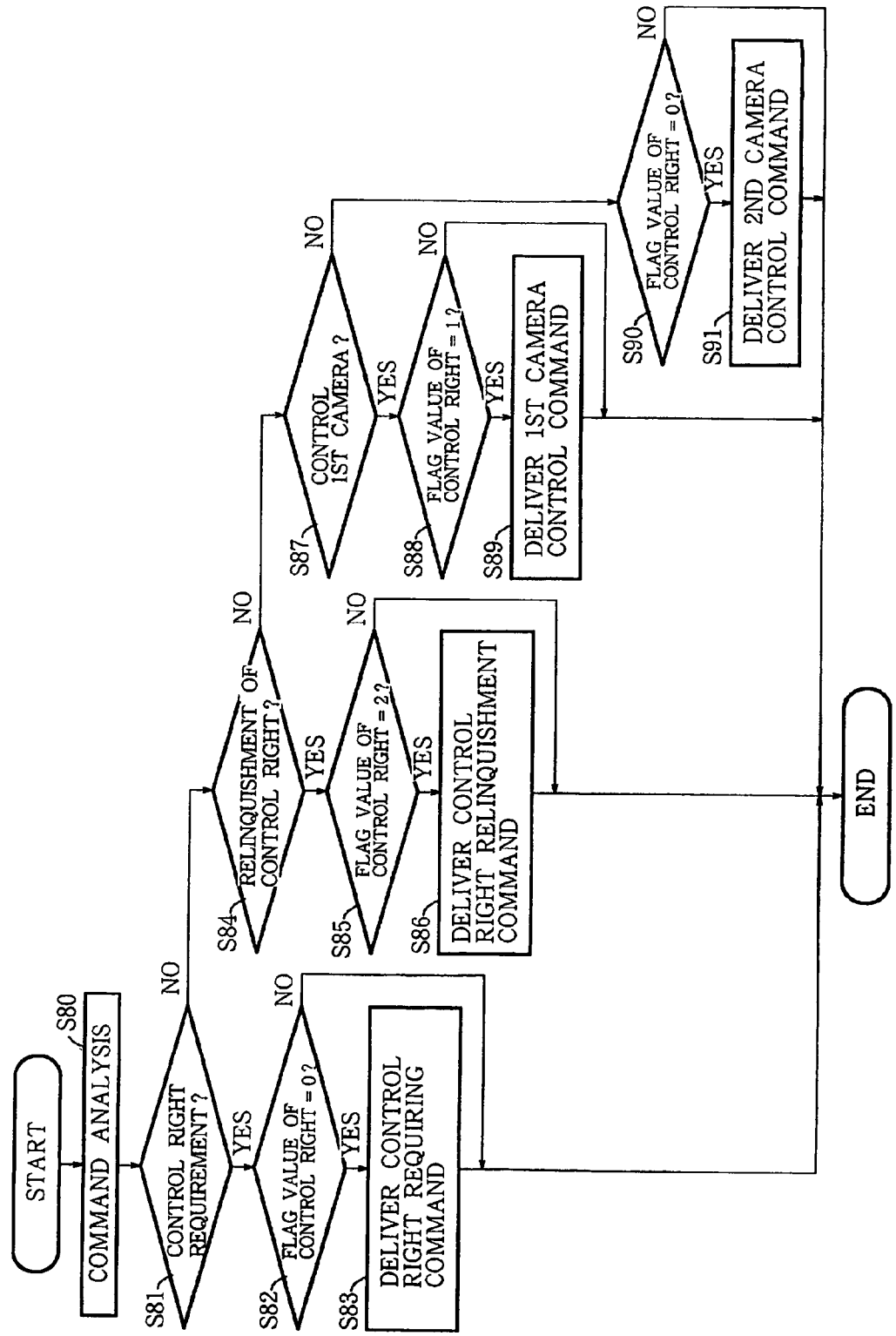
FIG. 14 is a flowchart for illustrating the processing steps when the client receives an input signal applied from an input device.

The processing programs, which are programed being subjected to the flowcharts shown in FIGS. 12-14, are preliminarily stored in the ROM 205 of Client 200 (x). When the CPU 204 reads out and executes the programs, Client 200 (x) operates as follows:

First, when Client 200 (x) is started, an initiation processing step is performed in Client 200 (x) even though the step is unshown in the drawings.

For instance, the CPU 204 applies said connection requiring command through the communication I/O circuit 203 to the server 100, which results in registration of Client 200 (x) on the client list of the server 100 and in completion of the connection between Client 200 (x) and the network 600. This brings about a status wherein the data communication of the image signals and the control commands turns capable.

2-2. Image Receiving Processing
(cf. FIG. 12 Shown Above)

When Client 200 (x) receives the image signal from the server 100, the CPU 204 first performs the image receiving processing through the communication I/O circuit 203, thereby to store the received image signal (the image packet) in the RAM 206 (Step S50).

Next, the CPU 204 passes a judgment whether the image signal stored in the RAM 206 is produced from the first camera 300 or not (Step S51).

If the judgment passed at Step S51 indicates that the image signal is produced from the first camera 300, the CPU 204 applies the image signal, which is stored in the RAM 206, to the display 201. The display 201 displays the image signal output from the CPU 204 on the image display area 701 shown previously in FIG. 6 (Step S52).

On the contrary, if the judgment passed at Step S51 indicates that the image signal is produced from the second camera 400, the CPU 204 outputs the image signal, which is stored in the RAM 206, to the display 201 similarly to Step S52. The display 201 displays the image signal output from the CPU 204 on the image display areas 701 and 702 shown previously in FIG. 6 (Step S53).

After processing at Step S52 or at Step S53, the processing flow returns again to Step S50 to repeat executing the processing steps thereinafter.

2-3. Command Receiving Processing (cf. FIG. 13 Shown Previously)

When Client 200 (x) receives the command from the server 100, the CPU 204 first analyzes the command received through the communication I/F circuit 203 (Step S60).

Subsequently, the CPU 204 determines dependently upon the analytical result obtained at Step S60 whether said command is a control right acquirement notifying command for notifying acquirement of the control right of the second camera 400 (Step S61).

Incidentally, if a certain client provides the server 100 with the control right requirement command as mentioned above, the server 100 accepts the control right requirement command and delivers the control right acquirement notifying command to each client. Aforesaid command for notifying corresponds to the command for notifying acquirement of the control right herein. When each client receives the control right acquiring notification command mentioned above, the control right acquisition processing is completed.

If the determination resulted at Step S61 indicates that the command is for notifying acquirement of the control right of the second camera 400, the CPU 204 passes a judgment whether the client delivering the control right requirement is the self client or not (Step S62).

If the resultant judgment passed at Step S62 indicates that the client which outputs the control right requirement is the self client, the CPU 204 sets a flag value of the control right for illustrating an acquiring status of the control right as "2" (Step S63).

Then the CPU 204 sets a display color of the frame for defining the image pickup range of the second camera 400 at a red color display mode (Step S65).

After performing Step S65, the frame for defining the image pickup range of the second camera 400 in the image display area 701 shown previously in FIG. 6 is updated to be actually displayed in a red color (Step S73).

After that, the main processing is completed.

On the contrary, if the resultant judgment passed at Step S62 indicates that the client which outputs the control right requirement is not the self client, the CPU 204 sets the flag value of the control right for illustrating the acquiring status of the control right as "1" (Step S64).

Then the CPU 204 also sets the "pan-&-tilt" button 704 and the "zoom" button 705 for controlling the first camera 300 into a grayout display mode (Step S66) and sets the frame for defining the image pickup range of the second camera 400 into a blue color display mode (Step S67).

The processing performed at Step S66 turns the "pan-&-tilt" button 704 and the "zoom" button 705, which are displayed on the control panel 703 of the display 201, into a grayout status while the processing performed at Step S67 turns the frame for defining the image pickup range of the second camera 400 into blue lines when re-displayed on the image plane area 701 (Step S73).

The main processing is then finished.

On the other hand, if the judgment passed on the analysis at Step S61 indicates that the command is not the command for notifying acquirement of the control right, the CPU 204 determines whether the command is the command for notifying relinquishment of the right to control the second camera 400 or not (Step S68).

If the determination result at Step S68 indicates that the command is the command for notifying to relinquish the control right of the second camera 400, the CPU 204 sets the flag value of the control right for indicating the acquiring status of the control right as "0" (Step S69).

The CPU 204 further sets the "pan-&-tilt" button 704 and the "zoom" button 705 for controlling the first camera 300 as a solid line display status (Step S70) as well as sets the frame for defining the image pickup range of the second camera 400 into a yellow color display mode (Step S71).

The processing performed at Step S70 turns the "pan-&-tilt" button 704 and the "zoom" button 705, which are displayed on the control panel 703 of the display 201, into the solid lines. Meanwhile another processing performed at Step S71 turns the frame for defining the image pickup range of the second camera 400 into the yellow lines when the frame of the second camera 400 is re-displayed on the image plane 701. (Step S73).

Then main processing is completed.

On a case when the determination resulted at Step S68 indicates that the command is not the command for notifying the control right relinquishment of the second camera 400, namely the control command of the second camera 400 (such as the frame of the image pickup range etc.) which is output from another client, the CPU 204 computes a positioning and dimensions of the frame of the image pickup range dependently upon the command and sets them for display (Step S72).

Performing Step S72 enables to re-display the image signal produced from the second camera 400 with the positioning and the dimensions of the set values computed at Step S72 on the image display area 701 of the display 201 (Step S73).

Incidentally, the flag values of the control right mentioned above can take "0", "1" or "2". The meanings of the flag value of the control right are summarized as follows:

0: Any client does not have the control right of the second camera 400. (The image pickup area of the second camera 400 is displayed by the yellow frame.)
1: Another client has the control right of the second camera 400. (The image pickup area of the second camera 400 is displayed by the blue frame.)
2: The self client has the control right of the second camera 400. (The image pickup area of the second camera 400 is displayed by the red frame.)

2-4. Receiving Processing of the User Instruction (cf. FIG. 14 Shown Previously)

First, the CPU 204 analyzes the command when the command is input to the input device 202 of Client 200 (x) (Step S80).

Next, the CPU 204 determines whether the input command is the instruction for requiring the control right or not on the basis of the analytical result at Step S80 (Step S81).

If the determination resulted at Step S81 indicates that the input command is the control right requiring command, the CPU 204 passes a judgment whether said flag value of the control right is "0" or not (Step S82).

Only when the judgment result at Step S82 indicates that the flag value of the control right is "0", the CPU 204 edits the control right requiring command and transmits it through the communication I/F circuit 203 to the server 100 (Step S83). Then the main processing is terminated. On the contrary, if the flag value of the control right is not "0", the main processing is immediately terminated because the control right requiring command is invalid therein.

If the result determined at Step 81 indicates that the input command is not the control right requiring one, the CPU 204 determines further whether the input command is the control right relinquishing requirement or not (Step S84).

In a case when the determination result mentioned above indicates that the input commands is the control right relinquishing requirement, the CPU 204 passes a judgment whether the flag value of the control right status is "2" or not (Step S85).

Only when the judgment result at Step S85 indicates that the flag value of control right information is "2", the CPU 204 edits a control right relinquishing command and transmits it through the communication I/F circuit 203 to the server 100 (Step S86). After that, the main processing is terminated. Incidentally, if the flag value of the control right status is not "2", the main processing is immediately terminated because the control right requiring command is invalid therein.

If the determination result at Step S84 indicates that the input command is not the control right relinquishing command, the CPU 204 passes a judgment whether the input command is the control instruction of the first camera 300 or not (Step S87).

When the judgment result passed at Step S87 indicates that the input command is the control instruction of the first camera 300, the CPU 204 further determines whether the flag value of the control right status is "1" or not (Step S88).

Only when the result determined at Step S88 indicates that the flag value of control right information is not "1", the CPU 204 edits the command for controlling the first camera 300 and outputs it through the communication I/F circuit 203 to the server 100 (Step S89). Thereinafter, the main processing is terminated. On the contrary, if the flag value of the control right status is "1", the main processing is immediately terminated because the control command of the first camera 300 which is requested from the self client is invalid when the other client has the control right.

If the judgment result passed at Step S87 indicates that the input command is not the control command of the first camera 300, namely the control command of the second camera 400, the CPU 204 determines whether the flag value of the control right status is "2" or not (Step S90).

Only when the result determined at Step S90 indicates that the flag value of the control right status is "2", the CPU 204 edits the command for controlling the second camera 400 and outputs it through the communication I/F circuit 203 to the server 100 (Step S91). Thereinafter, the main processing is terminated. On the contrary, if the flag value of the control right status is not "2", the main processing is immediately terminated because the control command of the second camera is invalid when the self client does not have the control right of the second camera 400.

3. Processings in Camera

Herein operations of the camera are to be illustrated with an especial reference to the first camera 300 to simplify the description because the first camera 300 and the second camera 400 are similarly constituted to each other.

Figure 15:
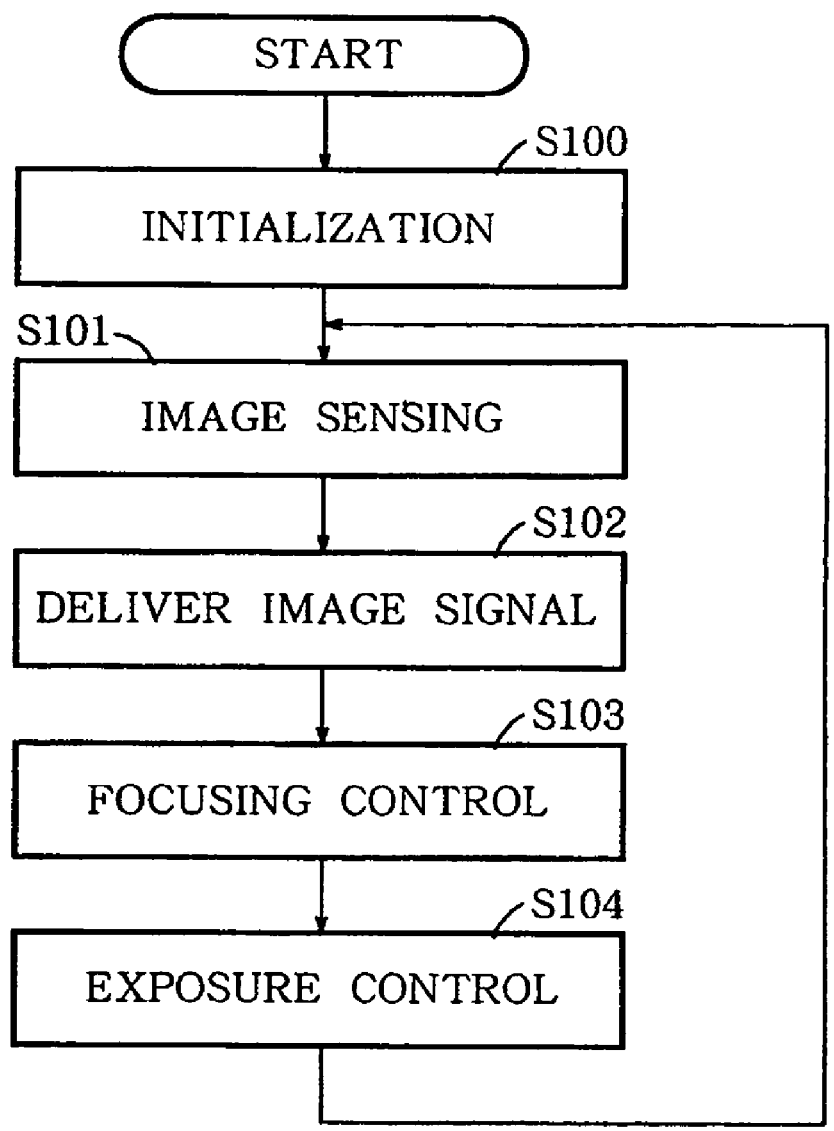
FIG. 15 is a flowchart for illustrating the steps of processing the image signal performed in the camera.
Figure 16:
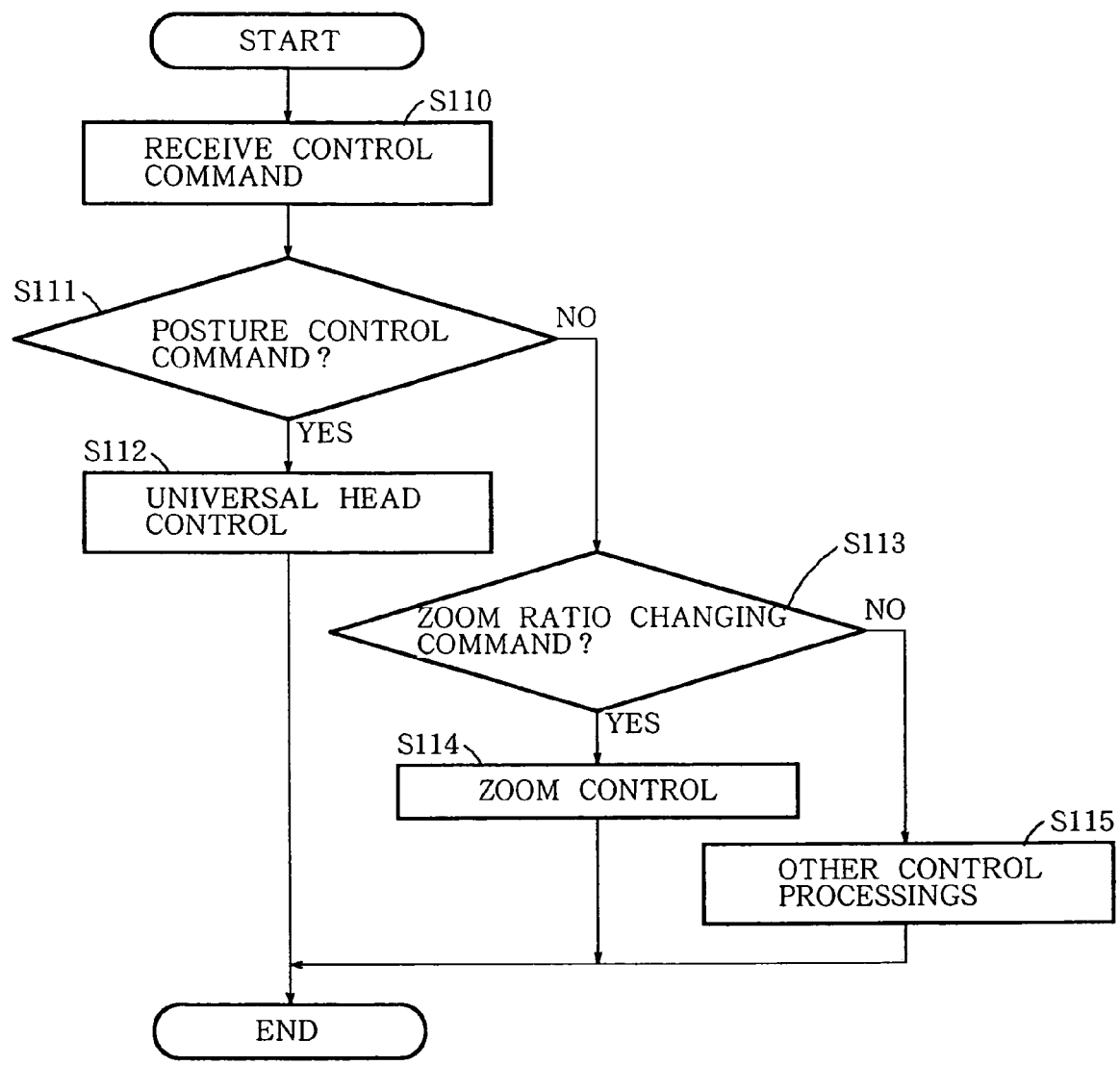
FIG. 16 is a flowchart for illustrating the processing steps when the camera receives the command from the server.

In the ROM 307 of the first camera 300 shown in FIG. 3, the processing programs which correspond to the flowcharts illustrated in FIGS. 15 and 16 are preliminarily stored. When the CPU 306 reads out and executes those processing programs, the first camera 300 operates as follows:

When the first camera 300 is started as shown in FIG. 15, the initialization processing is executed first (Step S100).

Herein the CPU 306 reads out the processing programs necessary for processing such as the main processing etc., which are stored in the ROM 307, to write them in the RAM 308. Further, the CPU 306 carries out the initialization of each circuit (the image pickup unit 301, the AF circuit 302, the AE circuit 303, the posture control circuit 304, the zoom control circuit 305 etc.).

Subsequently, the image pickup unit 301 picks up the image of the subject (Step S101) and applies thereby produced image signal through the image output I/F circuit 209 to the server 100 (Step S102).

On the other hand, the AF circuit 302 performs the automatic focusing control dependently upon the image signal output from the image pickup unit 301 (Step S103). Meanwhile the AE circuit 303 performs the automatic exposure control (Step S104).

The processings indicated at Steps S101-S104 are executed repeatedly.

Herein, the command output from the server 100 is received first at the control I/O circuit 310 as can be seen from FIG. 16 (Step S110).

Next, the CPU 306 passes a judgment whether the command received by the control I/O circuit 310 is the posture control command of the camera or not (Step S111).

If the judgment passed at Step S111 indicates that the received command is the posture control command, the CPU 306 outputs the command to the posture control circuit 304 to control the panhead dependently upon aforesaid received command (Step S112).

Then the main processings are terminated.

On the contrary, if the Judgment result passed at Step S111 indicates that the received command is not the posture control command, the CPU 306 further determines whether the received command is the zoom ratio conversion command or not (Step S113).

When the result determined at Step S113 indicates that the received command is the zoom ratio conversion command, the CPU 306 delivers the command to the zoom control circuit 305 to control the zoom ratio dependently upon aforesaid received command (Step S114).

After that, the main processings are terminated.

On the other hand, if the result determined at Step S113 indicates that the received command is not the zoom ratio conversion command, the CPU 306 executes the specified processing dependently upon the received command because the received command is for exchanging the data with other parameters (Step S115). The error processing also belongs to this step.

Then the main processings are terminated.

The present invention can be similarly carried out into practice by providing the system or the apparatus with a storage medium for storing a program code of a software which realizes the functions of the preferred embodiments mentioned above, wherein the computer, the CPU or the MPU included in the system or the apparatus reads and executes the program codes stored in the storage medium.

On that occasion, the program code itself which is read-out from the storage medium realizes the functions of the preferred embodiments mentioned above and, accordingly, the storage medium which stores the program code constitutes the present invention in fact.

As the storage medium for supplying the program code, for instance, a floppy disc, a hard disc, an optical disc, a magneto-optical disc, the CD-ROM, a compact disc recordable (referred to as "CD-R"), a magnetic tape, an involatile memory card, the ROM etc. are employable.

The procedures whereby the present invention can be carried out into practice include not only the case when the computer reads out and executes the program code but also include another case when an operation system (referred to as "OS") running on the computer performs a part or the whole of the actual processings dependently upon the instructions of the program code, of which processings realize aforesaid functions of the preferred embodiments.

Further, the procedures whereby the present invention can be carried out into practice include still another case when the program code read-out from the storage medium is written into a memory embedded either in an expansion board inserted in or in an expansion unit connected to the computer, followed by a part or the whole of the actual processings that the built-in CPU embedded either in the expansion board or in the expansion unit performs dependently upon the instructions of the program code, thereby aforesaid functions of the preferred embodiments being realized.

When the present invention is applied to the storage medium mentioned above, the program code dependently upon the flowcharts mentioned previously (the processing programs shown in FIGS. 9-16) is to be stored in the storage medium. Namely, a first module for acquiring the image signal that the camera picks up, a second module for applying the camera control command, a third module for switching the targeted cameras, to which the camera command is delivered, from one to another, a fourth module for transmitting the command to the camera, a fifth module for acquiring the control right of the desirable camera, a sixth module for storing information about the control right, a seventh module for restricting to control cameras except for the camera of which control right is acquired and an eighth module for displaying the picked up image and control right information mentioned above are to be stored in the storage medium.

As mentioned above, the present invention is constituted so that acquiring the control right of the desirable instrument out of the plurality of instruments can restrict the control of other instruments relating to the instrument when the plurality of instruments (the computer control-capable cameras etc.) connected to the network are simultaneously controlled remotely.

For instance, when the first and the second cameras installed relatedly with each other are simultaneously and remotely controlled, the control of the first camera is restricted to be either capable or incapable, dependently upon information about the control right status of the second camera (namely, the first status wherein no client acquires the control right, the second status wherein the anyone of other clients except for the self client acquire the control right and the third status wherein the self client acquires the control right). Actually, the control command input is rendered effective both in the first case when no client acquires the control right and in the third case when the self client acquires the control right while the control command input is turned uneffective in the second case when the other client acquire the control right.

Constituting the present invention as mentioned above makes it unnecessary to obtain individually all control rights of the related instruments. Accordingly, the present invention has an effectiveness to improve an operational efficiency in controlling the plurality of instruments.

On the other hand, the users can improve their operational efficiencies in controlling the instruments because they turn capable of concentrating themselves only upon controlling the instrument of which control right they acquire. Furthermore, the realizing cost of the present system is reducible because information about the control right acquisition status can be represented only by the three statuses: namely, the status wherein no client acquires the control right, the status wherein the self client acquires the control right and the status wherein any of the other clients acquires the control right.

What is claimed is:

1. A camera control system which is formed of a server/client constitution and enabling to control a plurality of cameras through a network, comprising:
   a first camera for being controlled in an image pickup direction;
   a second camera for being controlled in an image pickup direction;
   a control device for controlling the image pickup direction of said second camera which picks up an area within an image pickup range of said first camera; and
   a control restriction device for restricting to control said first camera when an arbitrary client acquires a control right of said second camera.

2. The control system according to claim 1, wherein:
   said control restriction device restricts controlling of said first camera performed by another client which does not acquire said control right.

3. A method of controlling a control system which is formed of a server/client constitution and enabling through a network to control capable of controlling an image pickup direction of a first camera and a second camera, comprising:
   a control step of controlling the image pickup direction of said second camera, which picks up within an image pickup range of said camera; and
   a control restriction step of restricting to control said first camera when an arbitrary client acquires a control right of said second camera.

4. The control method according to claim 3, wherein:
   said control restriction step includes a step of restricting controlling of said first camera performed by other clients except for said client which acquires said control right of said second camera.

* * * * *